US012634057B2

(12) United States Patent
Ma et al.

(10) Patent No.: US 12,634,057 B2
(45) Date of Patent: May 19, 2026

(54) TRANSPORT BLOCK SIZE CALCULATION FOR ORTHOGONAL COVER CODING AND SUB-PHYSICAL-RESOURCE-BLOCK ALLOCATION FOR PHYSICAL UPLINK SHARED CHANNEL

(71) Applicant: QUALCOMM Incorporated, San Diego, CA (US)

(72) Inventors: Liangping Ma, San Diego, CA (US); Xiao Feng Wang, San Diego, CA (US); Alberto Rico Alvarino, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 18/473,112

(22) Filed: Sep. 22, 2023

(65) Prior Publication Data

US 2025/0105955 A1 Mar. 27, 2025

(51) Int. Cl.
*H04L 5/00* (2006.01)
*H04J 13/18* (2011.01)

(52) U.S. Cl.
CPC ............ *H04L 5/0016* (2013.01); *H04J 13/18* (2013.01)

(58) Field of Classification Search
CPC ... H04L 5/0016; H04L 5/0053; H04L 5/0092; H04L 27/2636; H04J 13/18; H04J 13/004
See application file for complete search history.

(56) References Cited

U.S. PATENT DOCUMENTS 11,632,143 B1 * 4/2023 Thommana .......... H04B 1/0003
370/335
2009/0185638 A1 * 7/2009 Imamura ............... H04L 1/0025
375/298

(Continued)

FOREIGN PATENT DOCUMENTS

WO WO-2022154739 A1 7/2022
WO WO-2022155082 A1 7/2022

OTHER PUBLICATIONS

International Search Report and Written Opinion—PCT/US2024/043901—ISA/EPO—Dec. 9, 2024.

*Primary Examiner* — Christine Y Ng
(74) *Attorney, Agent, or Firm* — Holland & Hart LLPQualcomm Incorporated

(57) ABSTRACT

Methods, systems, and devices for wireless communications are described. A user equipment (UE) may account for the application of orthogonal cover coding (OCC) to an uplink transmission when determining the transport block size (TBS) for the uplink transmission. OCC may be used to multiplex transmissions from multiple UEs and may involve spreading information. Described techniques may involve accounting for the spreading of information bits when determining the TBS for the uplink transmission to which OCC is applied. Sub-physical resource block (sub-PRB) frequency allocations may be provided for uplink transmissions. The UE may account for the allocated quantity of sub-carriers when determining the quantity of information bits. To indicate a sub-PRB, the UE may be configured to reinterpret one or more fields of an existing downlink control information (DCI) format as indicating the allocated sub-carriers, or a new DCI format may be configured that includes fields for indicating a sub-PRB allocation.

30 Claims, 17 Drawing Sheets

Receive an indication of an orthogonal cover code configuration associated with uplink shared channel transmissions for the UE, where the orthogonal cover code configuration is associated with a spreading factor — 1405

Receive scheduling information for an uplink shared channel transmission — 1410

Perform the uplink shared channel transmission in accordance with the scheduling information and the orthogonal cover code configuration, where a quantity of information bits associated with data transmission in the uplink shared channel transmission is based on the spreading factor — 1415

1400

(56)     References Cited

U.S. PATENT DOCUMENTS

| | | | |
|---|---|---|---|
| 2012/0002568 A1* | 1/2012 | Tiirola | H04L 5/0053 |
| | | | 370/252 |
| 2012/0113831 A1* | 5/2012 | Pelletier | H04L 5/0053 |
| | | | 370/252 |
| 2014/0112289 A1* | 4/2014 | Kim | H04W 16/14 |
| | | | 370/329 |
| 2014/0269454 A1 | 9/2014 | Papasakellariou | |
| 2017/0171865 A1 | 6/2017 | Hwang et al. | |
| 2019/0140793 A1* | 5/2019 | Takeda | H04J 11/00 |
| 2019/0372719 A1* | 12/2019 | Talarico | H04L 1/189 |
| 2020/0314815 A1 | 10/2020 | Kim et al. | |
| 2022/0052779 A1 | 2/2022 | Ye et al. | |
| 2022/0116919 A1 | 4/2022 | Shin et al. | |
| 2022/0116967 A1 | 4/2022 | Yeo et al. | |
| 2022/0248449 A1 | 8/2022 | Su et al. | |
| 2022/0303988 A1* | 9/2022 | Yi | H04L 5/0044 |
| 2025/0106841 A1 | 3/2025 | Shah et al. | |
| 2025/0106842 A1 | 3/2025 | Ma et al. | |
| 2025/0119915 A1 | 4/2025 | Ma et al. | |

* cited by examiner 115-d 105-c

Scheduling Information for Uplink Transmission
that indicates a sub-PRB allocation

505

510

Uplink Transmission

500

1010

1020

1015

1005

1000

OCC Configuration Manager

1225

Uplink Reception Manager

1235

UE OCC Capability Manager

1245

UE Sub-PRB Capability Manager

1255

Network OCC Capability Manager

1265

Network Sub-PRB Capability Manager

1275

Uplink Scheduling Manager

1230

Sub-PRB Uplink Scheduling Manager

1240

TB Manager

1250

DCI Manager

1260

TBoMS Manager

1270

1220

1200

130

105

115

Network
Entity

Transceiver

1310

Antenna

1315

Communications
Manager

1320

Memory

Code

1330

1325

1340

Processor

1335

1305

1300

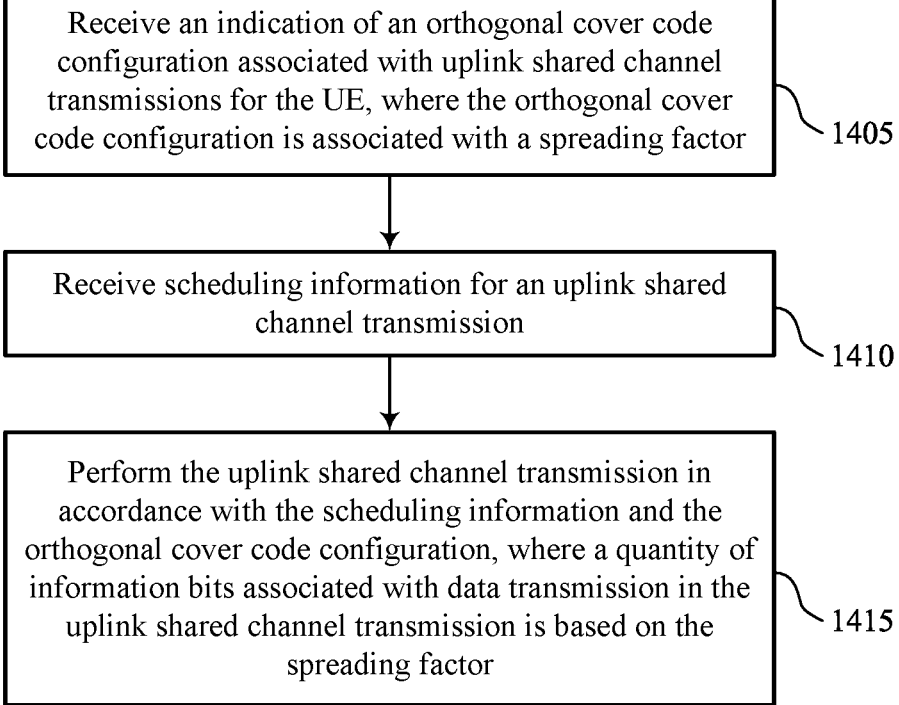

Receive an indication of an orthogonal cover code configuration associated with uplink shared channel transmissions for the UE, where the orthogonal cover code configuration is associated with a spreading factor

1405

Receive scheduling information for an uplink shared channel transmission

1410

Perform the uplink shared channel transmission in accordance with the scheduling information and the orthogonal cover code configuration, where a quantity of information bits associated with data transmission in the uplink shared channel transmission is based on the spreading factor

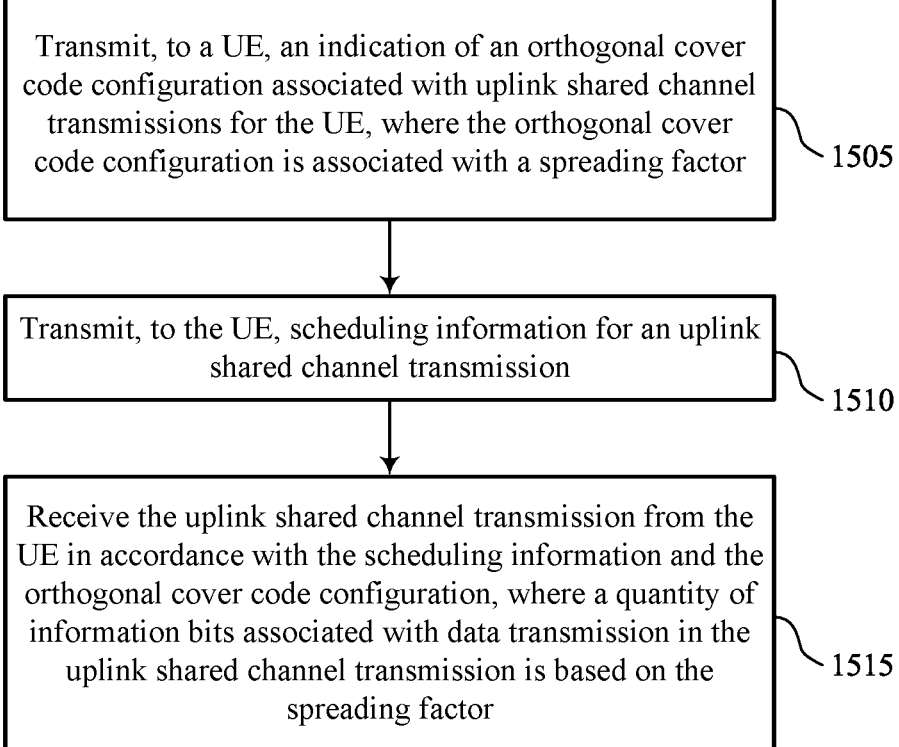

Transmit, to a UE, an indication of an orthogonal cover code configuration associated with uplink shared channel transmissions for the UE, where the orthogonal cover code configuration is associated with a spreading factor

1505

Transmit, to the UE, scheduling information for an uplink shared channel transmission

1510

Receive the uplink shared channel transmission from the UE in accordance with the scheduling information and the orthogonal cover code configuration, where a quantity of information bits associated with data transmission in the uplink shared channel transmission is based on the spreading factor

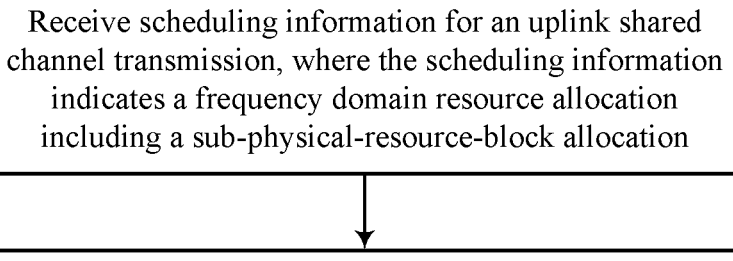

Receive scheduling information for an uplink shared channel transmission, where the scheduling information indicates a frequency domain resource allocation including a sub-physical-resource-block allocation

1605

Perform the uplink shared channel transmission in accordance with the scheduling information, where a quantity of information bits in the uplink shared channel transmission is based on a quantity of sub-carriers included in the sub-physical-resource-block allocation

Figure 17:
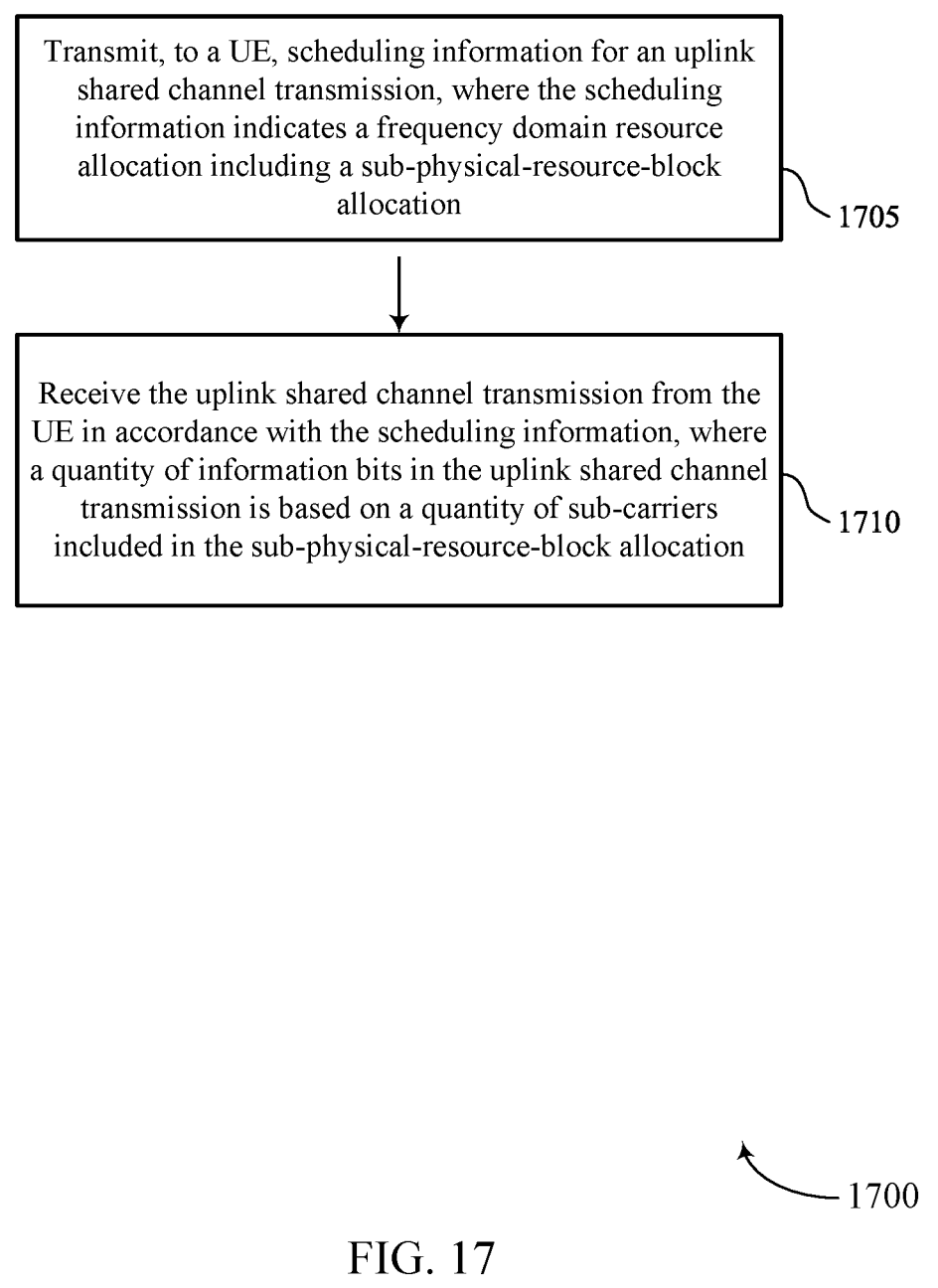

Transmit, to a UE, scheduling information for an uplink shared channel transmission, where the scheduling information indicates a frequency domain resource allocation including a sub-physical-resource-block allocation ⟍ 1705

Receive the uplink shared channel transmission from the UE in accordance with the scheduling information, where a quantity of information bits in the uplink shared channel transmission is based on a quantity of sub-carriers included in the sub-physical-resource-block allocation ⟍ 1710

TRANSPORT BLOCK SIZE CALCULATION FOR ORTHOGONAL COVER CODING AND SUB-PHYSICAL-RESOURCE-BLOCK ALLOCATION FOR PHYSICAL UPLINK SHARED CHANNEL

FIELD OF TECHNOLOGY

The following relates to wireless communications, including transport block size calculation for orthogonal cover coding and sub-physical resource block allocation for physical uplink shared channel.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support transport block (TB) size (TBS) calculation for orthogonal cover coding (OCC) and sub-physical resource block (sub-PRB) allocation for physical uplink shared channel. For example, the described techniques provide for accounting for the application of OCC to an uplink transmission when determining the TBS for the uplink transmission. For example, OCC may be used to multiplex transmissions from multiple UEs and may involve spreading information bits, for example, by a factor equal to the quantity of UEs being multiplexed. Described techniques may involve accounting for the spreading of information bits when determining the TBS for the uplink transmission to which OCC is applied. As another example, the described techniques provide for sub-PRB frequency allocation for uplink transmissions. Use of sub-PRB frequency allocation for uplink may enable orthogonal transmissions from the perspective of the receiver (e.g., the network entity) and may allow for efficient utilization of the frequency spectrum between multiple UEs. When the scheduling information (e.g., the downlink control information (DCI)) for a PUSCH indicates a sub-PRB allocation, the UE may account for the allocated quantity of sub-carriers when determining the quantity of information bits. To indicate a sub-PRB resource allocation, the UE may be configured to (e.g., via radio resource control (RRC) or a medium access control (MAC) control element (MAC-CE)) reinterpret one or more fields of an existing DCI format as indicating the allocated sub-carriers, or a new DCI format may be configured that includes fields for indicating a sub-PRB allocation.

A method for wireless communications by a UE is described. The method may include receiving an indication of an OCC configuration associated with uplink shared channel transmissions for the UE, where the OCC configuration is associated with a spreading factor, receiving scheduling information for an uplink shared channel transmission, and performing the uplink shared channel transmission in accordance with the scheduling information and the OCC configuration, where a quantity of information bits associated with data transmission in the uplink shared channel transmission is based on the spreading factor.

An apparatus for wireless communication is described. The apparatus may include a memory, a transceiver, and at least one processor of a user equipment, the at least one processor coupled with the memory and the transceiver. The at least one processor may be configured to cause the apparatus to receive, via the transceiver, an indication of an OCC configuration associated with uplink shared channel transmissions for the UE, where the OCC configuration is associated with a spreading factor, receive, via the transceiver, scheduling information for an uplink shared channel transmission, and perform the uplink shared channel transmission, via the transceiver, in accordance with the scheduling information and the OCC configuration, where a quantity of information bits associated with data transmission in the uplink shared channel transmission is based on the spreading factor.

Another UE for wireless communications is described. The UE may include means for receiving an indication of an OCC configuration associated with uplink shared channel transmissions for the UE, where the OCC configuration is associated with a spreading factor, means for receiving scheduling information for an uplink shared channel transmission, and means for performing the uplink shared channel transmission in accordance with the scheduling information and the OCC configuration, where a quantity of information bits associated with data transmission in the uplink shared channel transmission is based on the spreading factor.

A non-transitory computer-readable medium storing code for wireless communications is described. The code may include instructions executable by a processor to receive an indication of an OCC configuration associated with uplink shared channel transmissions for the UE, where the OCC configuration is associated with a spreading factor, receive scheduling information for an uplink shared channel transmission, and perform the uplink shared channel transmission in accordance with the scheduling information and the OCC configuration, where a quantity of information bits associated with data transmission in the uplink shared channel transmission is based on the spreading factor.

Some examples of the method, apparatuses, and non-transitory computer-readable medium described herein may further include operations, features, means, or instructions for transmitting an indication of a capability of the UE to apply OCC to uplink shared channel transmissions for the UE, where reception of the indication of the OCC configuration may be responsive to the indication of the capability of the UE.

Some examples of the method, apparatuses, and non-transitory computer-readable medium described herein may further include operations, features, means, or instructions for receiving, from a network entity, an indication of a capability of the network entity to support reception of uplink shared channel transmissions encoded via OCC, where transmission of the indication of the capability of the UE may be responsive to the indication of the capability of the network entity.

Some examples of the method, apparatuses, and non-transitory computer-readable medium described herein may further include operations, features, means, or instructions for generating, in accordance with the OCC configuration, a transport block having the quantity of information bits based on the spreading factor, where performing the uplink shared channel transmission includes transmitting the transport block.

Some examples of the method, apparatuses, and non-transitory computer-readable medium described herein may further include operations, features, means, or instructions for accounting for the spreading factor in a determination of a quantity of resource elements (REs) for the transport block, where the quantity of information bits may be based on the quantity of REs, and where the quantity of information bits being based on the spreading factor may be due at least in part to the quantity of information bits being based on the quantity of REs.

Some examples of the method, apparatuses, and non-transitory computer-readable medium described herein may further include operations, features, means, or instructions for accounting for the spreading factor in a determination of the quantity of information bits, where a determination of the quantity of information bits may be further based on a determination of a quantity of REs for the transport block, and where the quantity of REs may be independent of the spreading factor.

In some examples of the method, apparatuses, and non-transitory computer-readable medium described herein, transmitting the transport block may include operations, features, means, or instructions for transmitting the transport block over a set of multiple slots, where the scheduling information includes a time domain resource allocation that indicates the set of multiple slots.

In some examples of the method, apparatuses, and non-transitory computer-readable medium described herein, the OCC configuration indicates which rows or columns of a Hadamard matrix or a discrete Fourier transform matrix may be associated with the UE.

Some examples of the method, apparatuses, and non-transitory computer-readable medium described herein may further include operations, features, means, or instructions for receiving the indication of the OCC configuration via a first control message and receiving the scheduling information via a second control message.

Some examples of the method, apparatuses, and non-transitory computer-readable medium described herein may further include operations, features, means, or instructions for receiving the indication of the OCC configuration and the scheduling information via a same control message.

A method for wireless communications by a network entity is described. The method may include transmitting, to a UE, an indication of an OCC configuration associated with uplink shared channel transmissions for the UE, where the OCC configuration is associated with a spreading factor, transmitting, to the UE, scheduling information for an uplink shared channel transmission, and receiving the uplink shared channel transmission from the UE in accordance with the scheduling information and the OCC configuration, where a quantity of information bits associated with data transmission in the uplink shared channel transmission is based on the spreading factor.

An apparatus for wireless communication is described. The apparatus may include a memory and at least one processor of a network entity, the at least one processor coupled with the memory. The at least one processor may be configured to cause the apparatus to transmit, to a UE, an indication of an OCC configuration associated with uplink shared channel transmissions for the UE, where the OCC configuration is associated with a spreading factor, transmit, to the UE, scheduling information for an uplink shared channel transmission, and receive the uplink shared channel transmission from the UE in accordance with the scheduling information and the OCC configuration, where a quantity of information bits associated with data transmission in the uplink shared channel transmission is based on the spreading factor.

Another network entity for wireless communications is described. The network entity may include means for transmitting, to a UE, an indication of an OCC configuration associated with uplink shared channel transmissions for the UE, where the OCC configuration is associated with a spreading factor, means for transmitting, to the UE, scheduling information for an uplink shared channel transmission, and means for receiving the uplink shared channel transmission from the UE in accordance with the scheduling information and the OCC configuration, where a quantity of information bits associated with data transmission in the uplink shared channel transmission is based on the spreading factor.

A non-transitory computer-readable medium storing code for wireless communications is described. The code may include instructions executable by a processor to transmit, to a UE, an indication of an OCC configuration associated with uplink shared channel transmissions for the UE, where the OCC configuration is associated with a spreading factor, transmit, to the UE, scheduling information for an uplink shared channel transmission, and receive the uplink shared channel transmission from the UE in accordance with the scheduling information and the OCC configuration, where a quantity of information bits associated with data transmission in the uplink shared channel transmission is based on the spreading factor.

Some examples of the method, network entities, and non-transitory computer-readable medium described herein may further include operations, features, means, or instructions for receiving, from the UE, an indication of a capability of the UE to apply OCC to uplink shared channel transmissions for the UE, where transmission of the indication of the OCC configuration may be responsive to the indication of the capability of the UE.

Some examples of the method, network entities, and non-transitory computer-readable medium described herein may further include operations, features, means, or instructions for transmitting, to the UE, an indication of a capability of the network entity to support reception of uplink shared channel transmissions encoded via OCC, where reception of the indication of the capability of the UE may be responsive to the indication of the capability of the network entity.

In some examples of the method, network entities, and non-transitory computer-readable medium described herein, receiving the uplink shared channel transmission may include operations, features, means, or instructions for receiving, in accordance with the OCC configuration, a transport block having the quantity of information bits based on the spreading factor.

In some examples of the method, network entities, and non-transitory computer-readable medium described herein, a quantity of REs for the transport block accounts for the spreading factor, the quantity of information bits may be based on the quantity of REs, and the quantity of information bits being based on the spreading factor may be due at least in part to the quantity of information bits being based on the quantity of REs.

In some examples of the method, network entities, and non-transitory computer-readable medium described herein, the quantity of information bits accounts for the spreading factor, the quantity of information bits may be further based on a determination of a quantity of REs for the transport block, and the quantity of REs may be independent of the spreading factor.

In some examples of the method, network entities, and non-transitory computer-readable medium described herein, receiving the transport block may include operations, features, means, or instructions for receiving the transport block over a set of multiple slots, where the scheduling information includes a time domain resource allocation that indicates the set of multiple slots.

In some examples of the method, network entities, and non-transitory computer-readable medium described herein, the OCC configuration indicates which rows or columns of a Hadamard matrix or a discrete Fourier transform matrix may be associated with the UE.

Some examples of the method, network entities, and non-transitory computer-readable medium described herein may further include operations, features, means, or instructions for transmitting the indication of the OCC configuration via a first control message and transmitting the scheduling information via a second control message.

Some examples of the method, network entities, and non-transitory computer-readable medium described herein may further include operations, features, means, or instructions for transmitting the indication of the OCC configuration and the scheduling information via a same control message.

A method for wireless communications by a UE is described. The method may include receiving scheduling information for an uplink shared channel transmission, where the scheduling information indicates a frequency domain resource allocation (FDRA) including a sub-PRB allocation and performing the uplink shared channel transmission in accordance with the scheduling information, where a quantity of information bits in the uplink shared channel transmission is based on a quantity of sub-carriers included in the sub-PRB allocation.

An apparatus for wireless communication is described. The apparatus may include a memory, a transceiver, and at least one processor of a user equipment, the at least one processor coupled with the memory and the transceiver. The at least one processor may be configured to cause the apparatus to receive, via the transceiver, scheduling information for an uplink shared channel transmission, where the scheduling information indicates an FDRA including a sub-PRB allocation and perform, via the transceiver, the uplink shared channel transmission in accordance with the scheduling information, where a quantity of information bits in the uplink shared channel transmission is based on a quantity of sub-carriers included in the sub-PRB allocation.

Another UE for wireless communications is described. The UE may include means for receiving scheduling information for an uplink shared channel transmission, where the scheduling information indicates an FDRA including a sub-PRB allocation and means for performing the uplink shared channel transmission in accordance with the scheduling information, where a quantity of information bits in the uplink shared channel transmission is based on a quantity of sub-carriers included in the sub-PRB allocation.

A non-transitory computer-readable medium storing code for wireless communications is described. The code may include instructions executable by a processor to receive scheduling information for an uplink shared channel transmission, where the scheduling information indicates an FDRA including a sub-PRB allocation and perform the uplink shared channel transmission in accordance with the scheduling information, where a quantity of information bits in the uplink shared channel transmission is based on a quantity of sub-carriers included in the sub-PRB allocation.

Some examples of the method, apparatuses, and non-transitory computer-readable medium described herein may further include operations, features, means, or instructions for transmitting an indication of a capability of the UE to support sub-PRB allocations for uplink shared channel transmissions, where reception of the scheduling information may be responsive to the indication of the capability of the UE.

Some examples of the method, apparatuses, and non-transitory computer-readable medium described herein may further include operations, features, means, or instructions for receiving, from a network entity, an indication of a capability of the network entity to support sub-PRB allocations for reception of uplink shared channel transmissions, where transmission of the indication of the capability of the UE may be responsive to the indication of the capability of the network entity.

Some examples of the method, apparatuses, and non-transitory computer-readable medium described herein may further include operations, features, means, or instructions for receiving a control message indicating to interpret one or more fields of a DCI format as indicative of the sub-PRB allocation, where the scheduling information may be received via a DCI of the DCI format.

In some examples of the method, apparatuses, and non-transitory computer-readable medium described herein, the one or more fields include an FDRA field and the FDRA field indicates a set of PRBs for the uplink shared channel transmission and one or more subcarriers within each of the set of PRBs.

In some examples of the method, apparatuses, and non-transitory computer-readable medium described herein, the one or more fields include an FDRA field and at least one additional field, the FDRA field indicates a set of PRBs for the uplink shared channel transmission, and the at least one additional field indicates one or more subcarriers within each of the set of PRBs.

In some examples of the method, apparatuses, and non-transitory computer-readable medium described herein, the at least one additional field includes a modulation and coding scheme field, a transmit power command field, or a combination thereof.

Some examples of the method, apparatuses, and non-transitory computer-readable medium described herein may further include operations, features, means, or instructions for receiving the scheduling information via a DCI including a sub-PRB allocation field that indicates a set of PRBs for the uplink shared channel transmission and one or more subcarriers within each of the set of PRBs.

Some examples of the method, apparatuses, and non-transitory computer-readable medium described herein may further include operations, features, means, or instructions for receiving the scheduling information via a DCI including a first field indicating a set of PRBs for the uplink shared channel transmission and a second field indicating one or more subcarriers within each of the set of PRBs.

Some examples of the method, apparatuses, and non-transitory computer-readable medium described herein may further include operations, features, means, or instructions for generating, in accordance with the scheduling information, a transport block having the quantity of information bits based on the quantity of sub-carriers indicated in the sub-PRB allocation, where performing the uplink shared channel transmission includes transmitting the transport block.

Some examples of the method, apparatuses, and non-transitory computer-readable medium described herein may further include operations, features, means, or instructions for accounting for the quantity of sub-carriers in a determination of a quantity of REs for transport block, where the quantity of information bits may be based on the quantity of REs, and where the quantity of information bits being based on the quantity of sub-carriers may be due at least in part to the quantity of information bits being based on the quantity of REs.

In some examples of the method, apparatuses, and non-transitory computer-readable medium described herein, transmitting the transport block may include operations, features, means, or instructions for transmitting the transport block over a set of multiple slots, where the scheduling information includes a time domain resource allocation that indicates the set of multiple slots.

A method for wireless communications by a network entity is described. The method may include transmitting, to a UE, scheduling information for an uplink shared channel transmission, where the scheduling information indicates an FDRA including a sub-PRB allocation and receiving the uplink shared channel transmission from the UE in accordance with the scheduling information, where a quantity of information bits in the uplink shared channel transmission is based on a quantity of sub-carriers included in the sub-PRB allocation.

An apparatus for wireless communication is described. The apparatus may include a memory and at least one processor of a network entity, the at least one processor coupled with the memory. The at least one processor may be configured to cause the apparatus to transmit, to a UE, scheduling information for an uplink shared channel transmission, where the scheduling information indicates an FDRA including a sub-PRB allocation and receive the uplink shared channel transmission from the UE in accordance with the scheduling information, where a quantity of information bits in the uplink shared channel transmission is based on a quantity of sub-carriers included in the sub-PRB allocation.

Another network entity for wireless communications is described. The network entity may include means for transmitting, to a UE, scheduling information for an uplink shared channel transmission, where the scheduling information indicates an FDRA including a sub-PRB allocation and means for receiving the uplink shared channel transmission from the UE in accordance with the scheduling information, where a quantity of information bits in the uplink shared channel transmission is based on a quantity of sub-carriers included in the sub-PRB allocation.

A non-transitory computer-readable medium storing code for wireless communications is described. The code may include instructions executable by a processor to transmit, to a UE, scheduling information for an uplink shared channel transmission, where the scheduling information indicates an FDRA including a sub-PRB allocation and receive the uplink shared channel transmission from the UE in accordance with the scheduling information, where a quantity of information bits in the uplink shared channel transmission is based on a quantity of sub-carriers included in the sub-PRB allocation.

Some examples of the method, network entities, and non-transitory computer-readable medium described herein may further include operations, features, means, or instructions for receiving, from the UE, an indication of a capability of the UE to support sub-PRB allocations for uplink shared channel transmissions, where transmission of the scheduling information may be responsive to the indication of the capability of the UE.

Some examples of the method, network entities, and non-transitory computer-readable medium described herein may further include operations, features, means, or instructions for transmitting, to the UE, an indication of a capability of the network entity to support sub-PRB allocations for reception of uplink shared channel transmissions, where reception of the indication of the capability of the UE may be responsive to the indication of the capability of the network entity.

Some examples of the method, network entities, and non-transitory computer-readable medium described herein may further include operations, features, means, or instructions for transmitting, to the UE, a control message indicating to interpret one or more fields of a DCI format as indicative of the sub-PRB allocation, where the scheduling information may be transmitted via a DCI of the DCI format.

In some examples of the method, network entities, and non-transitory computer-readable medium described herein, the one or more fields include an FDRA field and the FDRA field indicates a set of PRBs for the uplink shared channel transmission and one or more subcarriers within each of the set of PRBs.

In some examples of the method, network entities, and non-transitory computer-readable medium described herein, the one or more fields include an FDRA field and at least one additional field, the FDRA field indicates a set of PRBs for the uplink shared channel transmission, and the at least one additional field indicates one or more subcarriers within each of the set of PRBs.

In some examples of the method, network entities, and non-transitory computer-readable medium described herein, the at least one additional field includes a modulation and coding scheme field, a transmit power command field, or a combination thereof.

Some examples of the method, network entities, and non-transitory computer-readable medium described herein may further include operations, features, means, or instructions for transmitting the scheduling information via a DCI including a sub-PRB allocation field that indicates a set of PRBs for the uplink shared channel transmission and one or more subcarriers within each of the set of PRBs.

Some examples of the method, network entities, and non-transitory computer-readable medium described herein may further include operations, features, means, or instructions for transmitting the scheduling information via a DCI including a first field indicating a set of PRBs for the uplink shared channel transmission and a second field indicating one or more subcarriers within each of the set of PRBs.

In some examples of the method, network entities, and non-transitory computer-readable medium described herein, receiving the uplink shared channel transmission may include operations, features, means, or instructions for receiving a transport block having the quantity of information bits based on the quantity of sub-carriers indicated in the sub-PRB allocation.

In some examples of the method, network entities, and non-transitory computer-readable medium described herein, a quantity of REs for transport block accounts for the quantity of sub-carriers, the quantity of information bits may be based on the quantity of REs, and the quantity of information bits being based on the quantity of sub-carriers may be due at least in part to the quantity of information bits being based on the quantity of REs.

In some examples of the method, network entities, and non-transitory computer-readable medium described herein, receiving the transport block may include operations, features, means, or instructions for receiving the transport block over a set of multiple slots, where the scheduling information includes a time domain resource allocation that indicates the set of multiple slots.

BRIEF DESCRIPTION OF THE DRAWINGS

FIGS. 14 through 17 show flowcharts illustrating methods that support TBS calculation for OCC and sub-PRB allocation for PUSCH in accordance with one or more aspects of the present disclosure.

DETAILED DESCRIPTION

Figure 1:
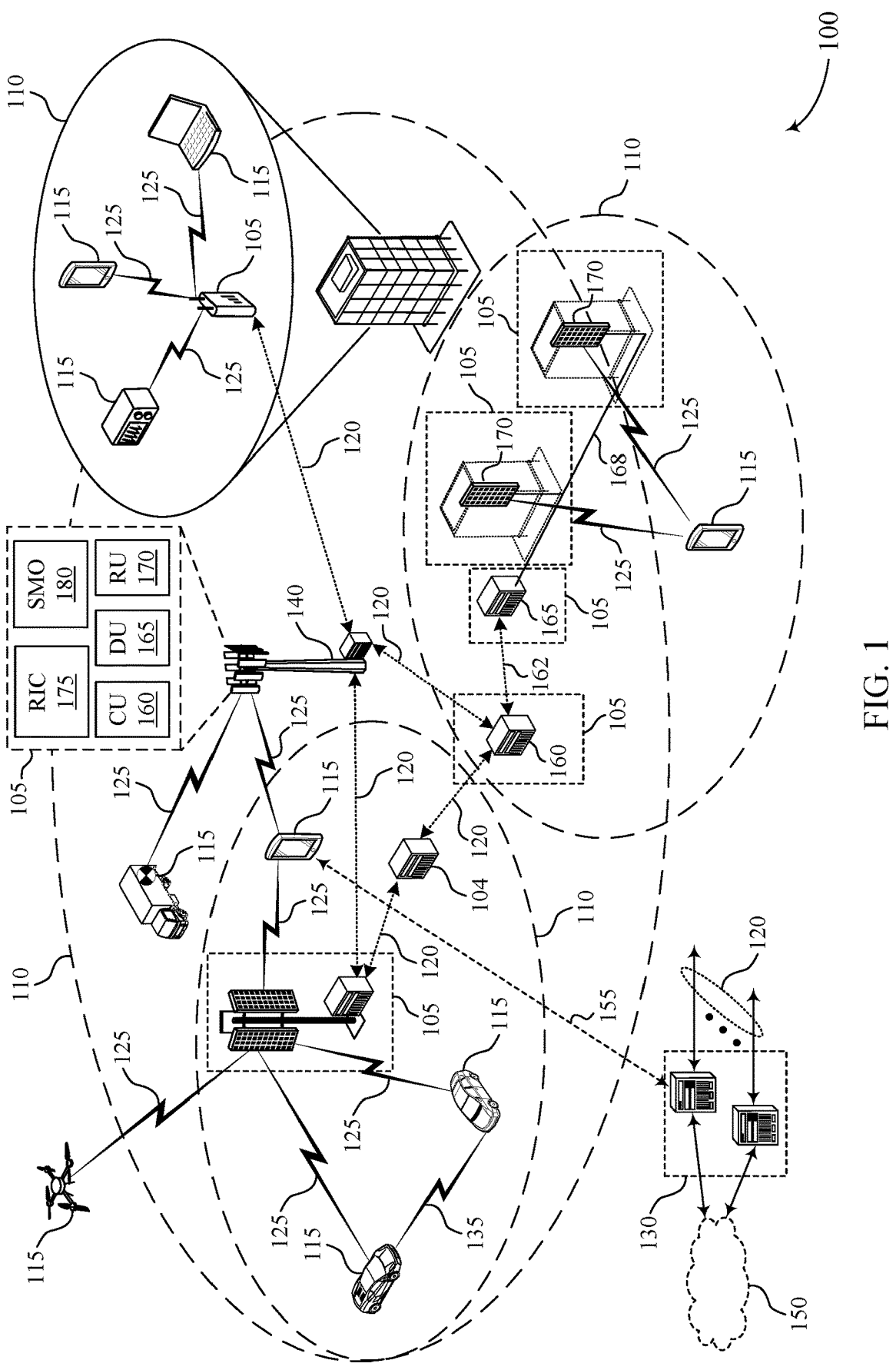
FIG. 1 shows an example of a wireless communications system that supports transport block size (TBS) calculation for orthogonal cover coding (OCC) and sub-physical resource block (sub-PRB) allocation for physical uplink shared channel (PUSCH) in accordance with one or more aspects of the present disclosure.

In wireless communications systems, the transport block (TB) size (TBS) for an uplink shared channel transmission (e.g., a physical uplink shared channel (PUSCH)) may be based on the quantity of resource elements (REs) allocated for the uplink shared channel transmission and the quantity of information bits. In some wireless communications systems, such as in non-terrestrial networks (NTNs), user equipments (UEs) may transmit multiple copies of data (e.g., repetition of data) to compensate for low coverage. In some examples, the repetitions may be leveraged to multiplex multiple UEs via the application of orthogonal cover codes (OCCs), which may increase overall system capacity. By multiplexing the multiple UEs with OCCs, a larger quantity of UEs may be supported with a same quantity of resources. OCC involves spreading the information bits, for example, by a factor equal to the quantity of UEs being multiplexed. TBS calculations may not account for the spreading factor in OCC, which may lead to overvaluation of the quantity of information bits.

In some examples, a minimum frequency domain resource allocation (FDRA) unit may be a physical resource block (PRB), which may include (e.g., span) a particular quantity (e.g., 12) of sub-carriers. A PRB may also include (e.g., span) a particular quantity (e.g., 7) of symbols. By assigning sub-carriers to UEs at a granularity smaller than PRBs (e.g., using individual resource allocations that span fewer sub-carriers than the quantity of sub-carriers included in a PRB, such as individual resource allocations that span 11 or fewer sub-carriers in examples in which a PRB spans 12 sub-carriers), however, orthogonal transmissions from the perspective of a receiver may be achieved, for example, as sub-carriers may be orthogonal. Assigning sub-carriers to UEs at a granularity smaller than PRBs may allow for more efficient utilization of the frequency spectrum between multiple UEs. Signaling for scheduling uplink shared channel transmissions, however, may not support the assignments of sub-PRB frequency allocation to UEs, and TBS calculations may not account for frequency allocation sizes of less than a PRB.

When OCC is configured for an uplink shared channel transmission, such as a PUSCH, the UE may account for the spreading factor when determining the quantity of information bits in the PUSCH (e.g., in determining the TBS for the PUSCH). For example, the quantity of information bits may be inversely proportional to the spreading factor. In some aspects, the UE may account for the spreading factor when determining the quantity of REs for the PUSCH, which then accounts for the spreading factor when determining the quantity of information bits as the quantity of information bits is determined based on the quantity of REs. In some examples, the UE may determine the quantity of REs in the same way as when OCC is not applied to a PUSCH and may account for the spreading factor when determining the quantity of information bits based on the quantity of REs.

When the scheduling information (e.g., the downlink control information (DCI)) for a PUSCH indicates a sub-PRB allocation, the UE may account for the allocated quantity of sub-carriers when determining the quantity of information bits. To indicate a sub-PRB resource allocation, the UE may be configured to (e.g., via radio resource control (RRC) or a medium access control (MAC) control element (MAC-CE)) reinterpret one or more fields of an existing DCI format as indicating the allocated sub-carriers, or a new DCI format may be configured that includes fields for indicating a sub-PRB allocation.

Aspects of the disclosure are initially described in the context of wireless communications systems. Aspects of the disclosure are further illustrated by and described with reference to resource diagrams, process flows, apparatus diagrams, system diagrams, and flowcharts that relate to TBS calculation for OCC and sub-PRB allocation for PUSCH.

FIG. 1 shows an example of a wireless communications system 100 that supports TBS calculation for OCC and sub-PRB allocation for PUSCH in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., RRC, service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, MAC layer) functionality and signaling and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support TBS calculation for OCC and sub-PRB allocation for PUSCH as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)). In a system employing MCM techniques, an RE may refer to resources of one symbol period (e.g., a duration of one modulation symbol) and one sub-carrier, in which case the symbol period and sub-carrier spacing may be inversely related. The quantity of bits carried by each RE may depend on the modulation scheme (e.g., the order of the modulation scheme, the coding rate of the modulation scheme, or both), such that a relatively higher quantity of REs (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a sub-carrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported sub-carrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on sub-carrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the sub-carrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples of the wireless communications system 100, the TBS for an uplink transmission (e.g., a PUSCH) may be based on the quantity of REs allocated for the uplink transmission and the quantity of information bits. For example, the quantity of REs for a PUSCH per PRB per slot, $N'_{RE}$, may be given by $$N'_{RE} = N^{RB}_{sc} \cdot N^{sh}_{symb} - N^{PRB}_{DMRS} - N^{PRB}_{oh},$$

where $$N^{RB}_{sc}$$

is the quantity of sub-carriers in the frequency domain in a PRB (e.g., 12), $$N^{sh}_{symb}$$

is the quantity of symbols of the PUSCH resource allocation, $$N^{PRB}_{DMRS}$$

is the quantity of REs for demodulation reference signal (DMRS) per PRB, and $$N^{PRB}_{oh}$$

is the additional overhead per PRB, for example, from phase tracking reference signal (PTRS). When a TB is transmitted over multiple slots (TBoMS), the scheduling information (e.g., the DCI) for the PUSCH may include a field numberOfSlotsTboMS that indicates the quantity of slots used, N. Thus, for TBoMS, the quantity of REs for a PUSCH across the N slots, $N_{RE}$, may be given by $N_{RE}$=N·min(156, $N'_{RE}$)·$n_{PRB}$, where $n_{PRB}$ is the total quantity of allocated PRBs for the UE. If a TB is transported over a single slot, then $N_{RE}$=min(156, $N'_{RE}$)·$n_{PRB}$. The quantity of information bits, $N_{info}$, in a TB may be given by $N_{info}$=$N_{RE}$·R·$Q_m$·v, where R is the target coding rate, $Q_m$ is the modulation order, and v is the quantity of layers. R, $Q_m$, and v may be indicated by the network entity 105 to the UE 115, for example, in the scheduling information for the uplink transmission.

In some wireless communications systems, such as in NTNs, UEs 115 may transmit multiple copies of data (e.g., repetition of data) to compensate for low coverage. In some examples, the repetitions may be leveraged to multiplex multiple UEs 115 via the application of OCC which may increase an overall system capacity. By multiplexing the multiple UEs 115 with OCCs, a larger quantity of UEs 115 may be supported with a same quantity of resources. OCC involves spreading the information bits, for example, by a factor equal to the quantity of UEs 115 being multiplexed. TBS calculations may not account for the spreading factor in OCC, which may lead to overvaluation of the quantity of information bits. When OCC is configured for an uplink shared channel transmission, such as a PUSCH, the UE 115 may account for the spreading factor when determining the quantity of information bits in the PUSCH, $N_{info}$. For example, the quantity of information bits, $N_{info}$, may be inversely proportional to the spreading factor. In some aspects, the UE 115 may account for the spreading factor when determining the quantity of REs for the PUSCH, $N_{RE}$, which then accounts for the spreading factor when determining the quantity of information bits as the quantity of information bits, $N_{info}$, is determined based on the quantity of RES, $N_{RE}$. In some examples, the UE 115 may determine the quantity of REs in the same way as when OCC is not applied to a PUSCH, and then may account for the spreading factor when determining the quantity of information bits, $N_{info}$, based on the quantity of RES, $N_{RE}$.

A minimum FDRA unit may be a PRB, which may include 12 sub-carriers. By assigning sub-carriers to UEs 115 at a granularity smaller than PRBs, however, orthogonal transmissions from the perspective of a receiver (e.g., a network entity 105) may be achieved, for example, as sub-carriers may be orthogonal. Assigning sub-carriers to UEs 115 at a granularity smaller than PRBs may allow for more efficient utilization of the frequency spectrum between multiple UEs 115. Signaling for scheduling uplink shared channel transmissions, however, may not support the assignments of sub-PRB frequency resource allocation to UEs 115, and TBS calculations may not account for frequency resource allocation granularity of less than a PRB. In some examples, OCC may be applied to sub-PRB allocations for PUSCH.

When the scheduling information (e.g., the DCI) for a PUSCH indicates a sub-PRB allocation, the UE 115 may account for the allocated quantity of sub-carriers when determining the quantity of information bits. To indicate a sub-PRB frequency resource allocation, the UE may be configured to (e.g., via RRC or a MAC-CE) to reinterpret one or more fields of an existing DCI format as indicating the allocated sub-carriers, or a new DCI format may be configured that includes fields for indicating a sub-PRB allocation.

Figure 2:
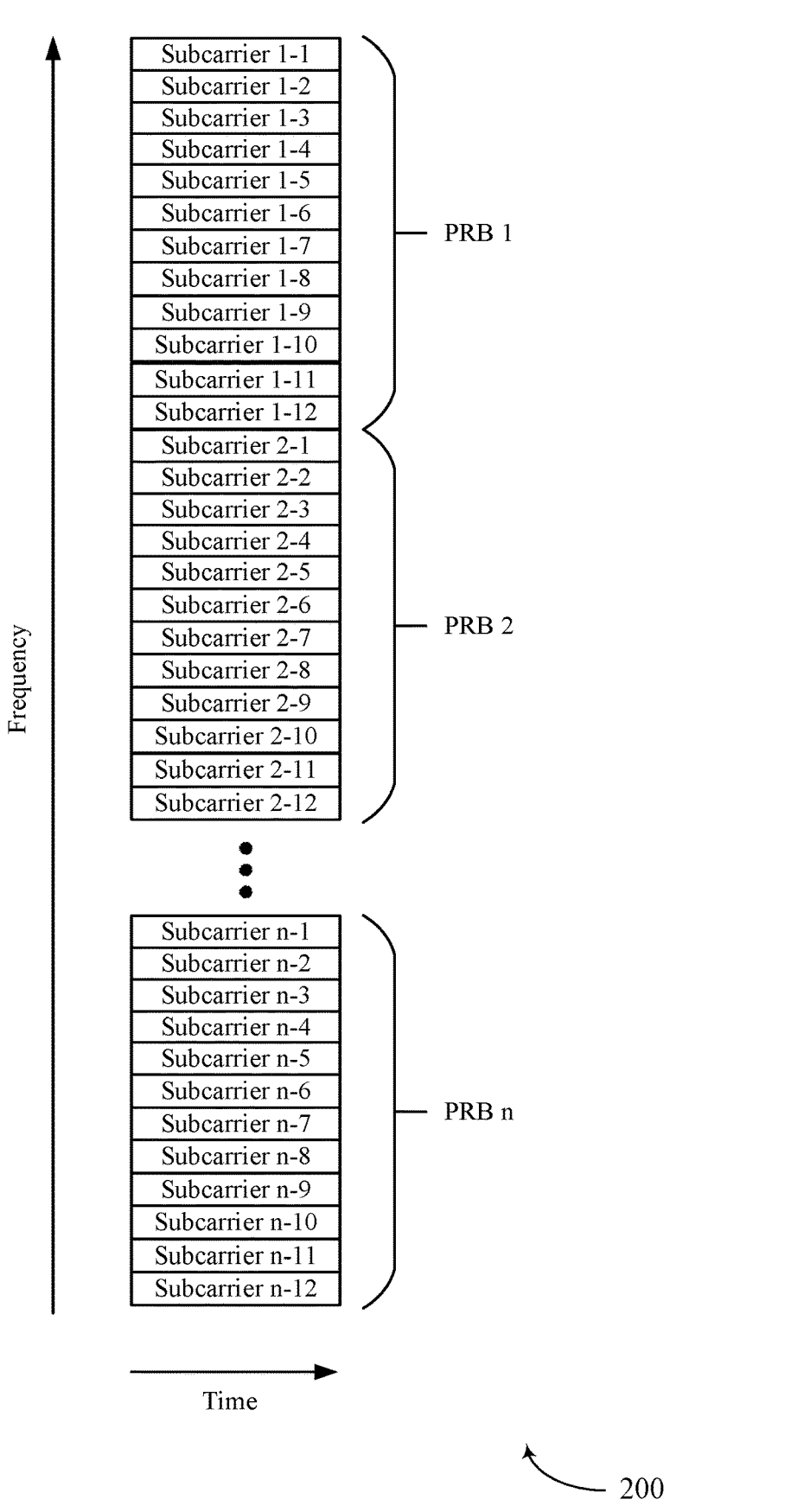
FIG. 2 shows an example of a resource diagram that supports TBS calculation for OCC and sub-PRB allocation for PUSCH in accordance with one or more aspects of the present disclosure.

FIG. 2 shows an example of a resource diagram 200 that supports TBS calculation for OCC and sub-PRB allocation for PUSCH in accordance with one or more aspects of the present disclosure. The resource diagram 200 may implement or may be implemented by aspects of the wireless communications system 100.

For example, a UE 115 may be configured with a component carrier or BWP that includes multiple PRBs (e.g., a PRB 1, PRB 2, . . . , PRB n). Each PRB may include 12 sub-carriers. In some examples, a PRB may include 7 symbols.

As described herein, in some examples, a PRB may be the minimum unit of granularity for an FDRA for an uplink transmission (e.g., a PUSCH). Accordingly, a UE 115 may be assigned each sub-carrier within the allocated PRB.

Some wireless communications systems, however, may implement sub-PRB frequency resource allocation for uplink transmissions. For example, the FDRA for a PUSCH may indicate a subset of sub-carriers within a PRB. For example, a UE 115 may be allocated sub-carriers 1-1, 1-3, 1-5, 1-7, 1-9, and 1-11 of PRB 1 for a PUSCH, and accordingly the UE 115 may transmit the uplink transmission via sub-carriers 1-1, 1-3, 1-5, 1-7, 1-9, and 1-11 of PRB 1 and not via sub-carriers 1-2, 1-4, 1-6, 1-8, 1-10, and 1-12 of PRB 1.

Figure 3:
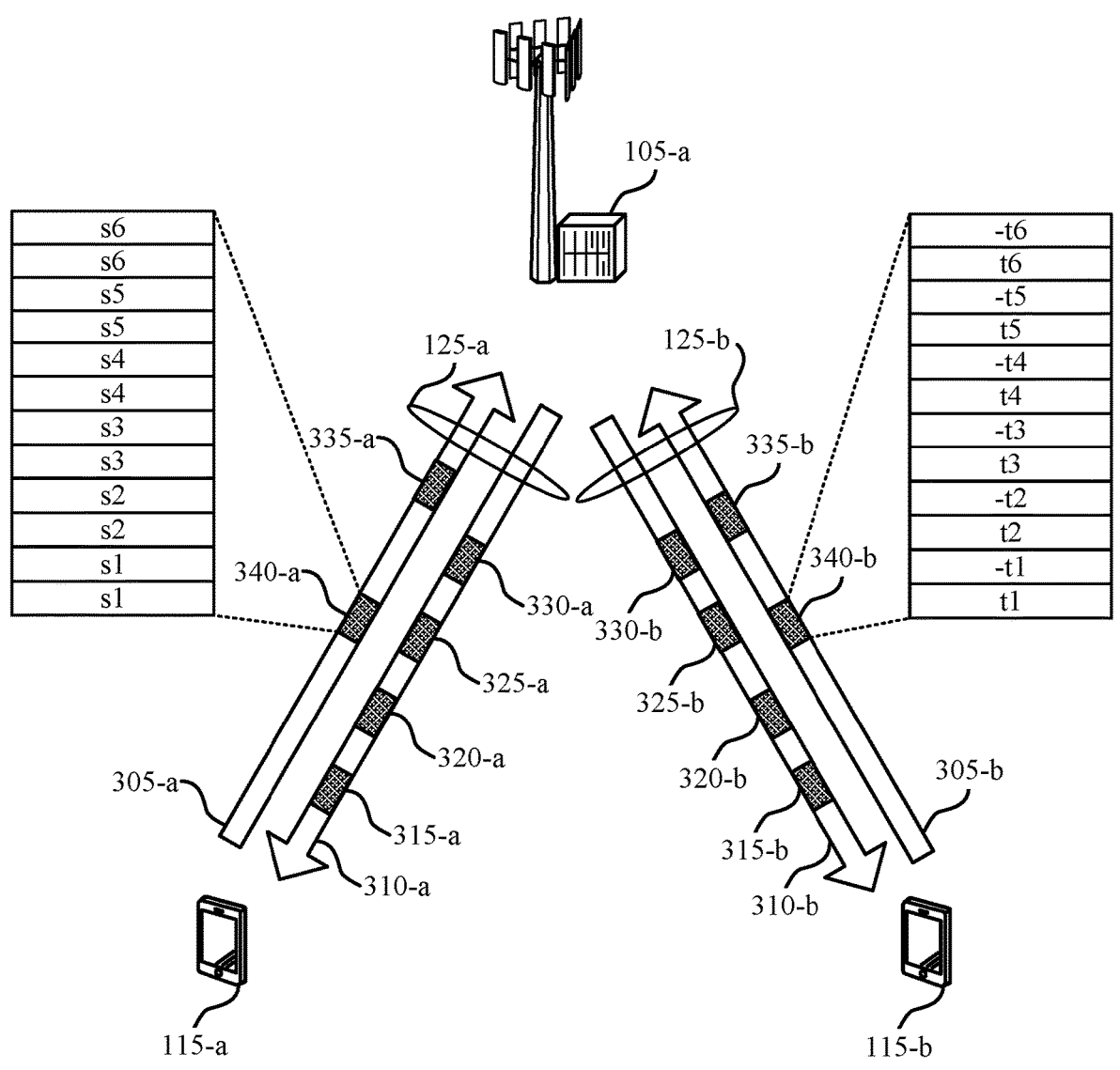
FIG. 3 shows an example of a wireless communications system that supports TBS calculation for OCC and sub-PRB allocation for PUSCH in accordance with one or more aspects of the present disclosure.

FIG. 3 shows an example of a wireless communications system 300 that supports TBS calculation for OCC and sub-PRB allocation for PUSCH in accordance with one or more aspects of the present disclosure. The wireless communications system 300 may implement aspects of or may be implemented by aspects of the wireless communications system 100. For example, the wireless communications system 300 includes a UE 115-*a* and a UE 115-*b*, which may be examples of a UE 115 described with respect to FIG. 1. The wireless communications system 300 also includes a network entity 105-*a*, which may be an example of a network entity 105 as described with respect to FIG. 1.

The UE 115-*a* may communicate with the network entity 105-*a* using a communication link 125-*a*, and the UE 115-*b* may communicate with the network entity 105-*a* using a communication link 125-*b*. The communication link 125-*a* may be an example of an NR or LTE link between the UE 115-*a* and the network entity 105-*a*. The communication link 125-*b* may be an example of an NR or LTE link between the UE 115-*b* and the network entity 105-*a*. In some examples, the communication link 125-*a* and/or the communication link 125-*b* may be examples of an NTN link. For example, the network entity 105-*a* may be a non-terrestrial network node. The communication link 125-*a* and the communication link 125-*b* may include bi-directional links that enable both uplink and downlink communications. For example, the UE 115-*a* may transmit the uplink signals 305-*a* (e.g., uplink transmissions), such as uplink control signals or uplink data signals, to the network entity 105-*a* using the communication link 125-*a* and the network entity 105-*a* may transmit downlink signals 310-*a* (e.g., downlink transmissions), such as downlink control signals or downlink data signals, to the UE 115-*a* using the communication link 125-*a*. The UE 115-*b* may transmit uplink signals 305-*b* (e.g., uplink transmissions), such as uplink control signals or uplink data signals, to the network entity 105-*a* using the communication link 125-*b* and the network entity 105-*a* may transmit downlink signals 310-*b* (e.g., downlink transmissions), such as downlink control signals or downlink data signals, to the UE 115-*b* using the communication link 125-*b*.

In some examples, uplink transmissions 340 from the UE 115-*a* and the UE 115-*b* may be multiplexed from the perspective of the network entity 105-*a*. Multiplexing uplink channel transmissions 340, however, may create interference at the network entity 105-*a*. In some examples, an orthogonal cover code (OCC) configuration may mitigate the potential interference. In particular, the data from the UE 115-*a* and the UE 115-*b* may be orthogonal cover coded in accordance with an OCC configuration. In some examples, the network entity 105-*a* may transmit control signaling 315-*a* that indicates an OCC configuration to the UE 115-*a* and control signaling in 315-*b* that indicates the OCC configuration to the UE 115-*b*. For example, the OCC configuration may indicate which rows of a Hadamard matrix or a DFT matrix for each UE 115 to apply.

In some examples, the network entity 105-*a* may transmit capability signaling 320 (e.g., capability signaling 320-*a* to the UE 115-*a* and capability signaling 320-*b* to the UE 115-*b*) that indicates that the network entity 105-*a* is capable of receiving multiplexed uplink transmissions based on an OCC configuration. In some examples, in response to the capability signaling 320-*a*, the UE 115-*a* may transmit capability signaling 335-*a* to the network entity 105-*a* that indicates that the UE 115-*a* is capable of applying OCC to uplink transmissions, and the network entity 105-*a* may transmit the control signaling 315-*a* in response to the capability signaling 335-*a*. Similarly, in response to the capability signaling 320-*b*, the UE 115-*b* may transmit capability signaling 335-*b* to the network entity 105-*a* that indicates that the UE 115-*b* is capable of applying OCC to uplink transmissions, and the network entity 105-*a* may transmit the control signaling 315-*b* in response to the capability signaling 335-*b*.

The network entity 105-*a* may transmit scheduling information 330-*a* to the UE 115-*a* that schedules the uplink transmission 340-*a*, and the network entity 105-*a* may transmit scheduling information 330-*b* to the UE 115-*b* that schedules the uplink transmission 340-*b*. In some examples, the scheduling information 330-*a* and the scheduling information 330-*b* may be DCIs. In some examples, the control signaling 315-*a* and the scheduling information 330-*a* may be transmitted in a same control message (e.g., a DCI may include the scheduling information and the indication of the OCC configuration) and the control signaling 315-*b* and the scheduling information 330-*b* similarly may be transmitted in a same control message. The scheduling information 330-*a* and the scheduling information 330-*b* may schedule the uplink transmission 340-*a* and the uplink transmission 340-*b* to be multiplexed.

As shown, the scheduling information 330-*a* may configure the UE 115-*a* to transmit symbols s1, s2, s3, s4, s5, and s6 in the uplink transmission 340-*a*, and an OCC length may be 2 (e.g., to multiplex uplink transmissions 340 from two UEs 115). Thus, each symbol s1, s2, s3, s4, s5, and s6 may be transmitted two times. As shown, a positive value may be applied to the OCC for each symbol in accordance with the OCC configuration indicated to the UE 115-*a*. The scheduling information 330-*b* may configure the UE 115-*b* to transmit symbols t1, t2, t3, t4, t5, and t6 in the uplink transmission 340-*b*, and the OCC length similarly may be 2. Thus, each symbol t1, t2, t3, t4, t5, and t6 may be transmitted two times. As shown, a positive value may be applied to the first OCC for t1, t2, t3, t4, t5, and t6 and a negative value may be applied to the second OCC for t1, t2, t3, t4, t5, and t6 in accordance with the OCC configuration indicated to the UE 115-*a*. Application of the negative OCC value may provide for orthogonality between the uplink transmission 340-*a* and the uplink transmission 340-*b*. For example, OCC may be applied before a DFT spreading and an inverse DFT (IDFT) operation on the symbols.

As OCC involves repetition of symbols, calculating the TBS without accounting for the OCC spreading may lead to an overvaluation of the quantity of information bits. Accordingly, the UE 115-*a* and the UE 115-*b* may adjust TBS determination when OCC is configured.

In some examples, a UE 115 indicated to apply OCC to an uplink transmission may change the calculation of the quantity of REs for the uplink transmission, $N_{RE}$, based on the indication to apply OCC to the uplink transmission in order to account for the OCC spreading. For example, the UE 115 may calculate $N_{RE}$ as $N_{RE}=[N \cdot \min(156, N'_{RE}) \cdot n_{PRB} \div SF]$ when the uplink transmission is a TBoMS or $N_{RE}=[\min(156, N'_{RE}) \cdot n_{PRB} \div SF]$ for a single slot uplink transmission, where SF is the spreading factor (e.g., length of the OCC) for the uplink transmission, $n_{PRB}$ is the number of allocated PRBs for the UE, and N is the number of slots spanning the time period for TBoMS. A floor function may be applied such that $N_{RE}$, when accounting for SF, results in an integer value that does not overvalue the quantity of resource elements. Accordingly, the quantity of information bits in the TB transmitted in the scheduled uplink transmission may be given by $N_{info}=N_{RE} \cdot R \cdot Q_m \cdot v$.

In some examples, the SF=F if only frequency domain (FD) OCC is configured, where F is the OCC code length for FD-OCC. In some examples, the SF=T if only time domain (TD) OCC is configured, where T is the OCC code length for TD-OCC. In some examples, SF=T×F, where both FD-OCC and TD-OCC are configured. In the example of FIG. 3, the UE 115-*a* may accordingly calculate the $N_{RE}=[\min(156, N'_{RE}) \cdot n_{PRB} \div SF]$ for the uplink transmission 340-*a* if the uplink transmission 340-*a* is a single slot transmission or as $N_{RE}=[N \cdot \min(156, N'_{RE}) \cdot n_{PRB} \div SF]$ if the uplink transmission 340-*a* is a TBoMS transmission. Similarly, the UE 115-*b* may calculate the $N_{RE}=[\min(156, N'_{RE}) \cdot n_{PRB} \div SF]$ for the uplink transmission 340-*b* if the uplink transmission 340-*b* is a single slot transmission or as $N_{RE}=[N \cdot \min(156, N'_{RE}) \cdot n_{PRB} \div SF]$ if the uplink transmission 340-*b* is a TBoMS transmission.

In some examples, the UE 115 indicated to apply OCC to an uplink transmission may change the calculation of the quantity of information bits for the uplink transmission, $N_{info}$, based on the indication to apply OCC to the uplink transmission in order to account for the OCC spreading. For example, the UE 115 may calculate $N_{RE}$ the same way as when OCC is not applied, but may calculate $N_{info}$ as $N_{info} = [N_{RE} \cdot R \cdot Q_m \cdot v \div SF]$. A floor function may be applied such that $N_{info}$, when accounting for SF, results in an integer value that does not overvalue the quantity of information bits. In the example of FIG. 3, the UE 115-*a* may accordingly calculate the $N_{info}$ for the uplink transmission 340-*a* as $N_{info} = [N_{RE} \cdot R \cdot Q_m \cdot v \div SF]$. Similarly, the UE 115-*b* may calculate $N_{info}$ for the uplink transmission 340-*b* as $N_{info} = [N_{RE} \cdot R \cdot Q_m \cdot v \div SF]$. The scheduling information 330-*a* and the scheduling information 330-*b* may provide the respective values of $$R, Q_m, v, N_{sc}^{RB}, N_{symb}^{sh}, N_{DMRS}^{PRB}, N_{oh}^{PRB},$$

and/or $n_{PRB}$ for the uplink transmission 340-*a* and the uplink transmission 340-*b*.

In some examples, different orthogonal sub-carriers may be assigned to the UE 115-*a* and the UE 115-*b* via sub-PRB frequency allocation for the uplink transmissions 340. For example, when different sub-carriers are allocated to the UE 115-*a* and the UE 115-*b* the uplink transmission 340-*a* and the uplink transmission 340-*b* may be orthogonal and thus may not create interference with each other. In such examples where a UE 115 is provided a sub-PRB frequency resource allocation, the UE 115 may adjust the calculation of the quantity of REs for the corresponding uplink transmissions 340. For example, the quantity of REs for an uplink transmission (e.g., a PUSCH) per slot, $N'_{RE}$, may be given as $$N'_{RE} = N_{sc} \cdot N_{symb}^{sh} - N_{DMRS} - N_{oh},$$

where $$N_{symb}^{sh}$$

is the quantity of symbols of the PUSCH resource allocation, $N_{DMRS}$ is the quantity of REs for DMRS, and $N_{oh}$ is the additional overhead. For PRB based FDRA, $N_{sc}$ is a multiple of 12. The quantity of REs for a PUSCH, $N_{RE}$, is then calculated as $N_{RE}=N^*\min(156, N_{RE})$ if the uplink transmission is a TBoMS or $N_{RE}=\min(156, N'_{RE})$ if the uplink transmission is transmitted in a single slot. And as described herein, the quantity of information bits in the TB, $N_{info}$, may be given by $N_{info}=N_{RE} \cdot R \cdot Q_m \cdot v$. When sub-PRB is applied, the value of $N_{sc}$ is based on the quantity of sub-carriers allocated for the uplink transmission and may be a value less than 12 or may be a value other than a multiple of 12. For example, the scheduling information 330-*a* may include an FDRA for the uplink transmission 340-*a* that indicates sub-PRB allocation, and the $N_{sc}$ the UE 115-*a* uses to calculate the $N'_{RE}$ is based on the quantity of sub-carriers indicated in the FDRA of the scheduling information 330-*a*. Similarly, the scheduling information 330-*b* may include an FDRA for the uplink transmission 340-*b* that indicates sub-PRB allocation, and the $N_{sc}$ the UE 115-*b* uses to calculate the $N'_{RE}$ is based on the quantity of sub-carriers indicated in the FDRA of the scheduling information 330-*b*.

In some examples, the capability signaling 320-*a* and/or the capability signaling 320-*b* may indicate that the network entity 105-*b* supports sub-PRB scheduling for uplink transmissions. In some examples, the capability signaling 320-*a* and/or the capability signaling 320-*b* may be a system information block (SIB). The capability signaling 335-*a* and/or the capability signaling 335-*b* may indicate that the UE 115-*a* and/or the UE 115-*b*, respectively, support sub-PRB scheduling for uplink transmissions. In such examples, the scheduling information 330-*a* and/or the scheduling information 330-*b* may indicate sub-PRB FDRAs for the uplink transmission 340-*a* and/or the uplink transmission 340-*b* based on the indication(s) that the UE 115-*a* and/or the UE 115-*b* support sub-PRB scheduling for uplink transmissions.

In some examples, the scheduling information 330-*a* and/or the scheduling information 330-*b* may be a DCI. In some examples, an existing DCI format may be reinterpreted to indicate a sub-PRB frequency allocation. For example, the network entity 105-*a* may transmit a control message 325 (e.g., a control message 325-*a* to the UE 115-*a* and a control message 325-*b* to the UE 115-*b*) that indicates for the UE 115-*a* to reinterpret a DCI format (e.g., DCI format 0_0 or 0_1) as intended for sub-PRB frequency resource allocation. For example, the control message 325 may be a MAC-CE or RRC. In some examples, the FDRA field in the reinterpreted DCI format may identify both the allocated PRBs and the sub-carriers within the allocated PRBs. For example, some bits in the FDRA may identify PRBs and other bits may identify sub-carriers within the identified PRBs, which may be possible to fit within an existing FDRA field as not all PRB combinations may be applicable to uplink coverage enhancement. In some examples, the FDRA field in combination with another repurposed field in the reinterpreted DCI format may identify the allocated PRBs and the sub-carriers within the allocated PRBs. For example, the FDRA field may identify one or more PRBs (the coarse resource allocation), and some other field(s) (e.g., modulation and coding scheme (MCS) or transmit power control (TPC) for PUSCH) may indicate the sub-carriers within the identified PRBs (the fine resource allocation). In coverage limited use cases, for example, the MCS and TPC for PUSCH fields may be less useful as MCS may be set to MCS0 and the UE 115 may transmit at the maximum power. The control message 325 may indicate how to reinterpret the existing DCI format (e.g., which fields indicate the coarse and fine resource allocations). In some examples, the time domain resource allocation field (TDRA) may be interpreted by the UE 115 to identify a pattern of time slots (e.g., the quantity of allocated time slots) or a pattern of OFDM symbols, and the pattern may be based on an OCC codeword. The control message 325 may indicate how to reinterpret the TDRA field.

In some examples, a new DCI format may be defined for sub-PRB resource allocation. In some examples, the new DCI format may identify one or more sub-carriers in a single field. In some examples, the new DCI format may include two fields, one to identify allocated PRBs and other bits may identify allocated sub-carriers within the allocated PRBs. In some examples, the TDRA may be interpreted by the UE 115 to identify a pattern of time slots (e.g., the quantity of allocated time slots) or a pattern of OFDM symbols.

Figure 4:
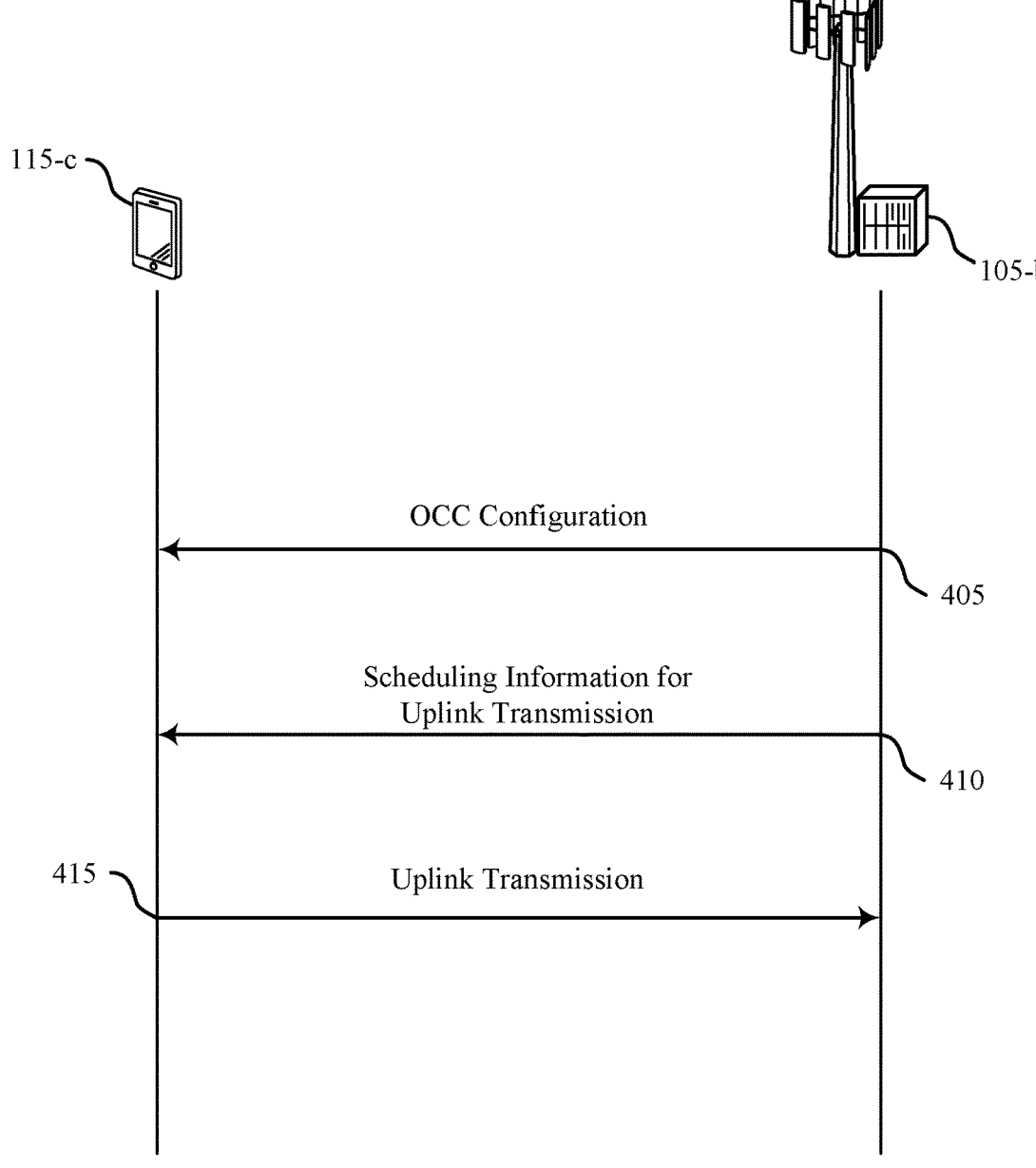
FIG. 4 shows an example of a process flow that supports TBS calculation for OCC and sub-PRB allocation for PUSCH in accordance with one or more aspects of the present disclosure.

FIG. 4 shows an example of a process flow 400 that supports TBS calculation for OCC and sub-PRB allocation for PUSCH in accordance with one or more aspects of the present disclosure. The process flow 400 may include a UE 115-*c*, which may be an example of a UE 115 as described herein. The process flow 400 may include a network entity 105-*b*, which may be an example of a network entity 105 as described herein. In the following description of the process flow 400, the operations between the network entity 105-*b* and the UE 115-*c* may be transmitted in a different order than the example order shown, or the operations performed by the network entity 105-*b* and the UE 115-*c* may be performed in different orders or at different times. Some operations may also be omitted from the process flow 400, and other operations may be added to the process flow 400.

At 405, the UE 115-*c* may receive, from the network entity 105-*b*, an indication of an OCC configuration associated with uplink shared channel transmissions for the UE 115-*c*, where the OCC configuration is associated with a spreading factor. In some examples, the OCC configuration indicates which rows or columns of a Hadamard matrix or a DFT matrix are associated with the UE 115-*c*. For example, the OCC may be used for multiplexing uplink transmissions from a set of UEs 115 including the UE 115-*c*, and the OCC configuration indicates which rows or columns of a Hadamard matrix or a DFT matrix for the UE 115-*c* to apply. The application of different rows or columns of the Hadamard matrix or the DFT matrix by the different UEs 115 result in the uplink transmissions from the different UEs 115 being orthogonal from the perspective of the network entity 105-*b*.

At 410, the UE 115-*c* may receive, from the network entity 105-*b*, scheduling information for an uplink shared channel transmission. In some examples, the indication of the OCC configuration and the scheduling information may be received via a same control message. In some examples, the indication of the OCC configuration and the scheduling information may be received via a different control messages. For example, the scheduling information may be a DCI and the indication of the cover code configuration may be received via a MAC-CE or RRC.

At 415, the UE 115-*c* may perform the uplink shared channel transmission to the network entity 105-*b* in accordance with the scheduling information and the OCC configuration, where a quantity of information bits (e.g., $N_{info}$) associated with data transmission in the uplink shared channel transmission is based on the spreading factor.

In some examples, the UE 115-*c* may transmit, to the network entity 105-*b*, an indication of a capability of the UE 115-*c* to apply OCC to uplink shared channel transmissions for the UE 115-*c*, and reception of the indication of the OCC configuration at 405 is responsive to the indication of the capability of the UE 115-*c*. In some examples, the UE 115-*c* may receive, from the network entity 105-*b*, an indication of a capability of the network entity 105-*b* to support reception of uplink shared channel transmissions encoded via OCC, and transmission of the indication of the capability of the UE 115-*c* is responsive to the indication of the capability of the network entity 105-*b*.

In some examples, the UE 115-*c* may generate, in accordance with the OCC configuration, a TB having the quantity of information bits (e.g., $N_{info}$) based on the spreading factor, where performing the uplink shared channel transmission at 415 includes transmitting the TB. Accordingly, the network entity 105-*b* may receive the TB having the quantity of information bits based on the spreading factor. In some examples, the UE 115-*c* may account for the spreading factor in a determination of a quantity of REs for the TB (e.g., $(N_{RE}=[\min(156, N'_{RE}) \cdot n_{PRB} \div SF])$ or $(N_{RE}=[N \cdot \min (156, N'_{RE}) \cdot n_{PRB} \div SF]))$, where the quantity of information bits is based on the quantity of REs, and where the quantity of information bits being based on the spreading factor is due at least in part to the quantity of information bits being based on the quantity of REs (e.g., $N_{info}=N_{RE} \cdot R \cdot Q_m \cdot v$). In some examples, the UE 115-*c* may account or the spreading factor in a determination of the quantity of information bits (e.g., $N_{info}=[N_{RE} \cdot R \cdot Q_m \cdot v \div SF]$), where a determination of the quantity of information bits is further based on a determination of a quantity of REs for the TB, and the quantity of REs is independent of the spreading factor. In some examples, the UE 115-*c* may transmit, and the network entity 105-*b* may receive, the TB over a set of multiple slots, where the scheduling information includes a TDRA that indicates the set of multiple slots.

Figure 5:
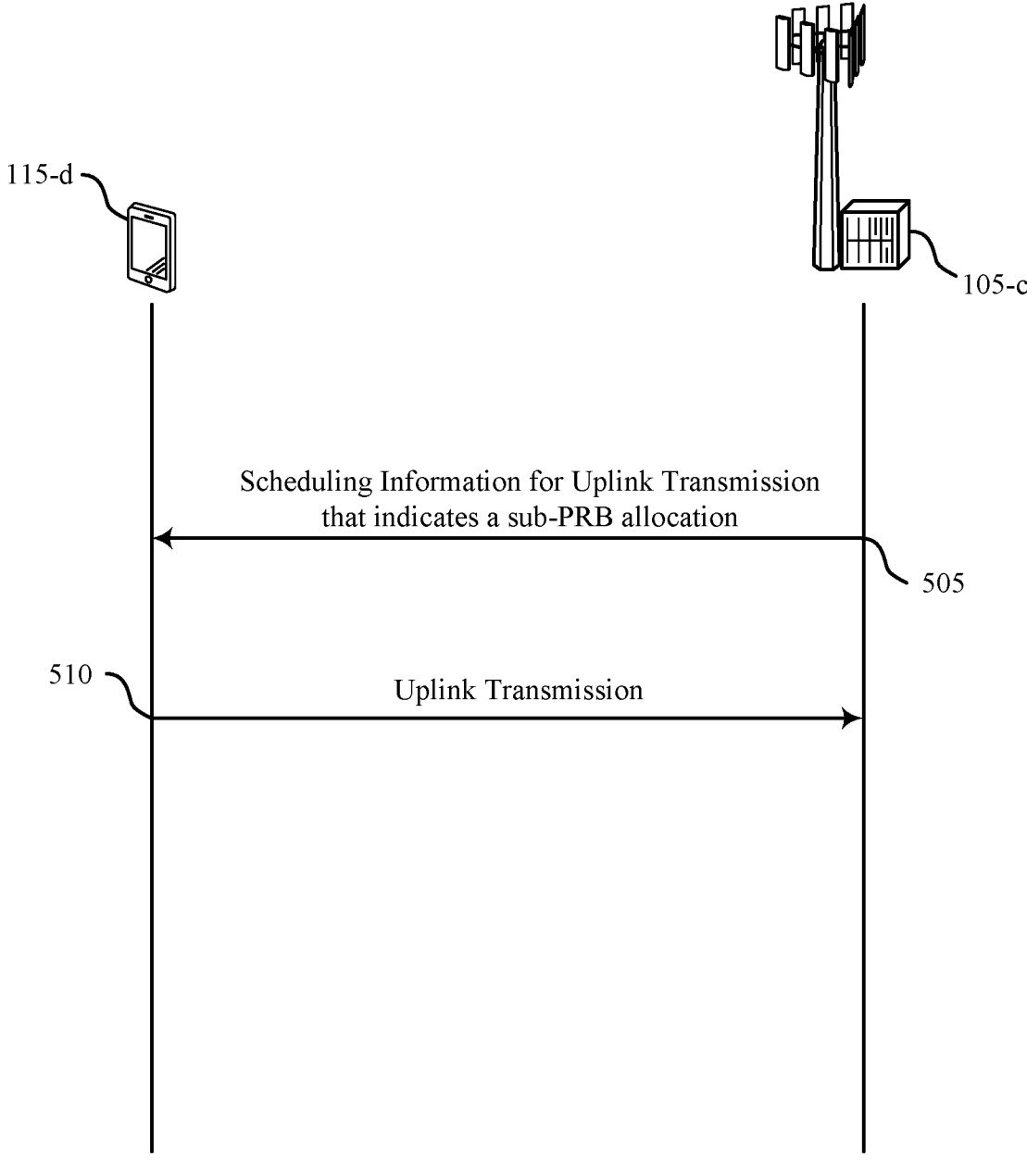
FIG. 5 shows an example of a process flow that supports TBS calculation for OCC and sub-PRB allocation for PUSCH in accordance with one or more aspects of the present disclosure.

FIG. 5 shows an example of a process flow 500 that supports TBS calculation for OCC and sub-PRB allocation for PUSCH in accordance with one or more aspects of the present disclosure. The process flow 500 may include a UE 115-*d*, which may be an example of a UE 115 as described herein. The process flow 400 may include a network entity 105-*c*, which may be an example of a network entity 105 as described herein. In the following description of the process flow 500, the operations between the network entity 105-*c* and the UE 115-*d* may be transmitted in a different order than the example order shown, or the operations performed by the network entity 105-*c* and the UE 115-*d* may be performed in different orders or at different times. Some operations may also be omitted from the process flow 500, and other operations may be added to the process flow 500.

At 505, the UE 115-*d* may receive, from the network entity 105-*c*, scheduling information for an uplink shared channel transmission, where the scheduling information indicates an FDRA including a sub-PRB allocation.

At 510, the UE 115-*d* may perform the uplink shared channel transmission to the network entity 105-*c* in accordance with the scheduling information, where a quantity of information bits in the uplink shared channel transmission is based on a quantity of sub-carriers included in the sub-PRB allocation (e.g., $N_{info}=N_{RE} \cdot R \cdot Q_m \cdot v$, where $$N_{RE} = \min(156, N'_{RE}) \text{ or } N_{RE} = N * \min(156, N'_{RE}),$$

where $$N'_{RE} = N_{sc} \cdot N^{sh}_{symb} - N_{DMRS} - N_{oh},$$

and where $N_{sc}$ is the quantity of allocated sub-carriers).

In some examples, the UE 115-*d* may transmit, to the network entity 105-*c*, an indication of a capability of the UE to support sub-PRB allocations for uplink shared channel transmissions, and reception of the scheduling information is responsive to the indication of the capability of the UE 115-*d*. In some examples, the network entity 105-*c* may transmit, to the UE 115-*d*, an indication of a capability of the network entity 105-*c* to support sub-PRB allocations for reception of uplink shared channel transmissions, and transmission of the indication of the capability of the UE 115-*d* is responsive to the indication of the capability of the network entity 105-*c*.

In some examples, the UE 115-*d* may receive, from the network entity 105-*c*, a control message indicating that the UE 115-*d* is to interpret one or more fields of a DCI format as indicative of the sub-PRB allocation, where the scheduling information is received via a DCI of the DCI format. In some examples, the one or more fields include an FDRA field, and where the FDRA field indicates a set of PRBs for the uplink shared channel transmission and one or more sub-carriers within each of the set of PRBs. In some examples, the one or more fields include an FDRA field and at least one additional field, where the FDRA field indicates a set of PRBs for the uplink shared channel transmission, and where the at least one additional field indicates one or more sub-carriers within each of the set of PRBs. In some examples, the at least one additional field includes a modulation and coding scheme field, a transmit power command field, or a combination thereof.

In some examples, the UE 115-*d* may receive, from the network entity 105-*c*, the scheduling information at 505 via a DCI including a sub-PRB allocation field that indicates a set of PRBs for the uplink shared channel transmission and one or more sub-carriers within each of the set of PRBs.

In some examples, the UE 115-*d* may receive, from the network entity 105-*c*, the scheduling information at 505 via a DCI including a first field indicating a set of PRBs for the uplink shared channel transmission and a second field indicating one or more sub-carriers within each of the set of PRBs.

In some examples, the UE 115-*d* may generate, in accordance with the scheduling information, a TB having the quantity of information bits based on the quantity of sub-carriers indicated in the sub-PRB allocation, and performing the uplink shared channel transmission at 510 includes transmitting the TB. In some examples, the UE 115-*d* may account for the quantity of sub-carriers in a determination of a quantity of REs for TB, where the quantity of information bits is based on the quantity of RES, and where the quantity of information bits being based on the quantity of sub-carriers is due at least in part to the quantity of information bits being based on the quantity of REs. In some examples, the UE 115-*d* may transmit, and the network entity 105-*c* may receive, the TB over a set of multiple slots, where the scheduling information includes a TDRA that indicates the set of multiple slots.

Figure 6:
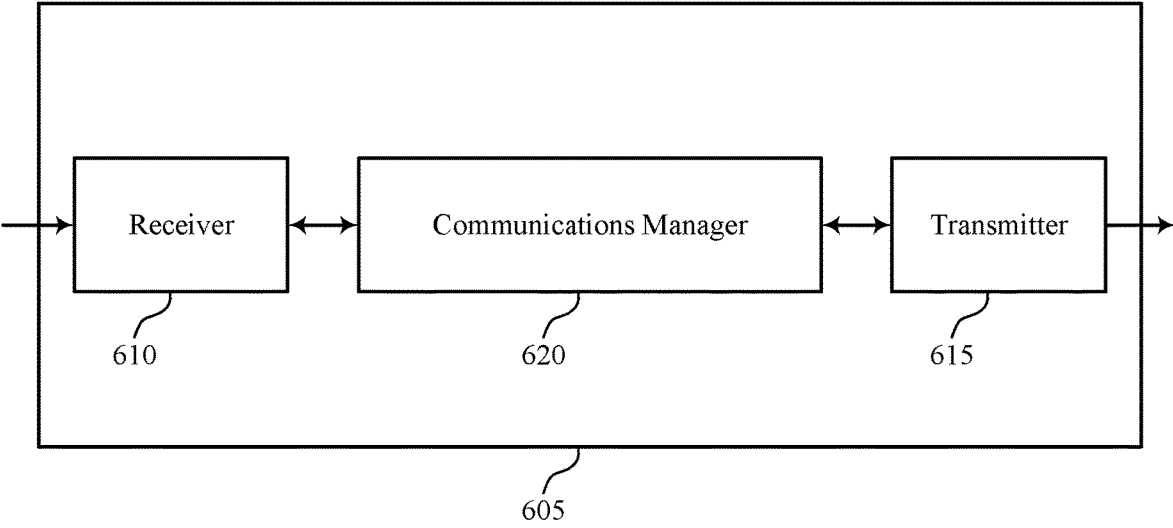
FIGS. 6 and 7 show block diagrams of devices that support TBS calculation for OCC and sub-PRB allocation for PUSCH in accordance with one or more aspects of the present disclosure.

FIG. 6 shows a block diagram 600 of a device 605 that supports TBS calculation for OCC and sub-PRB allocation for PUSCH in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to TBS calculation for OCC and sub-PRB allocation for PUSCH). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to TBS calculation for OCC and sub-PRB allocation for PUSCH). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of TBS calculation for OCC and sub-PRB allocation for PUSCH as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving an indication of an OCC configuration associated with uplink shared channel transmissions for the UE, where the OCC configuration is associated with a spreading factor. The communications manager 620 is capable of, configured to, or operable to support a means for receiving scheduling information for an uplink shared channel transmission. The communications manager 620 is capable of, configured to, or operable to support a means for performing the uplink shared channel transmission in accordance with the scheduling information and the OCC configuration, where a quantity of information bits associated with data transmission in the uplink shared channel transmission is based on the spreading factor.

Additionally, or alternatively, the communications manager 620 may support wireless communications in accordance with examples as disclosed herein. For example, the communications manager 620 is capable of, configured to, or operable to support a means for receiving scheduling information for an uplink shared channel transmission, where the scheduling information indicates an FDRA including a sub-PRB allocation. The communications manager 620 is capable of, configured to, or operable to support a means for performing the uplink shared channel transmission in accordance with the scheduling information, where a quantity of information bits in the uplink shared channel transmission is based on a quantity of sub-carriers included in the sub-PRB allocation.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for more efficient utilization of communication resources.

Figure 7:
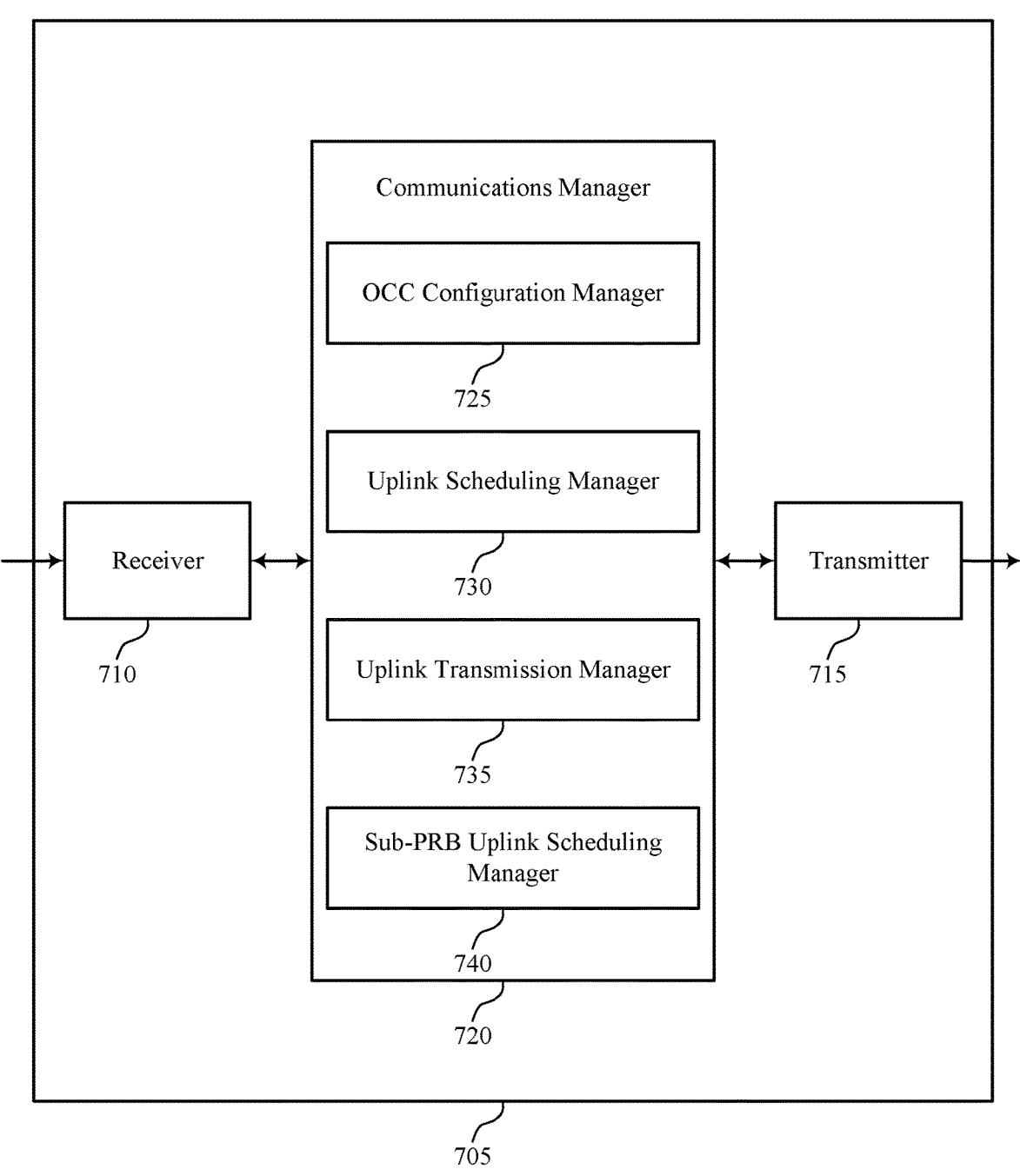

FIG. 7 shows a block diagram 700 of a device 705 that supports TBS calculation for OCC and sub-PRB allocation for PUSCH in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to TBS calculation for OCC and sub-PRB allocation for PUSCH). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to TBS calculation for OCC and sub-PRB allocation for PUSCH). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of TBS calculation for OCC and sub-PRB allocation for PUSCH as described herein. For example, the communications manager 720 may include a OCC configuration manager 725, an uplink scheduling manager 730, an uplink transmission manager 735, a sub-PRB uplink scheduling manager 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The OCC configuration manager 725 is capable of, configured to, or operable to support a means for receiving an indication of an OCC configuration associated with uplink shared channel transmissions for the UE, where the OCC configuration is associated with a spreading factor. The uplink scheduling manager 730 is capable of, configured to, or operable to support a means for receiving scheduling information for an uplink shared channel transmission. The uplink transmission manager 735 is capable of, configured to, or operable to support a means for performing the uplink shared channel transmission in accordance with the scheduling information and the OCC configuration, where a quantity of information bits associated with data transmission in the uplink shared channel transmission is based on the spreading factor.

Additionally, or alternatively, the communications manager 720 may support wireless communications in accordance with examples as disclosed herein. The sub-PRB uplink scheduling manager 740 is capable of, configured to, or operable to support a means for receiving scheduling information for an uplink shared channel transmission, where the scheduling information indicates an FDRA including a sub-PRB allocation. The uplink transmission manager 735 is capable of, configured to, or operable to support a means for performing the uplink shared channel transmission in accordance with the scheduling information, where a quantity of information bits in the uplink shared channel transmission is based on a quantity of sub-carriers included in the sub-PRB allocation.

Figure 8:
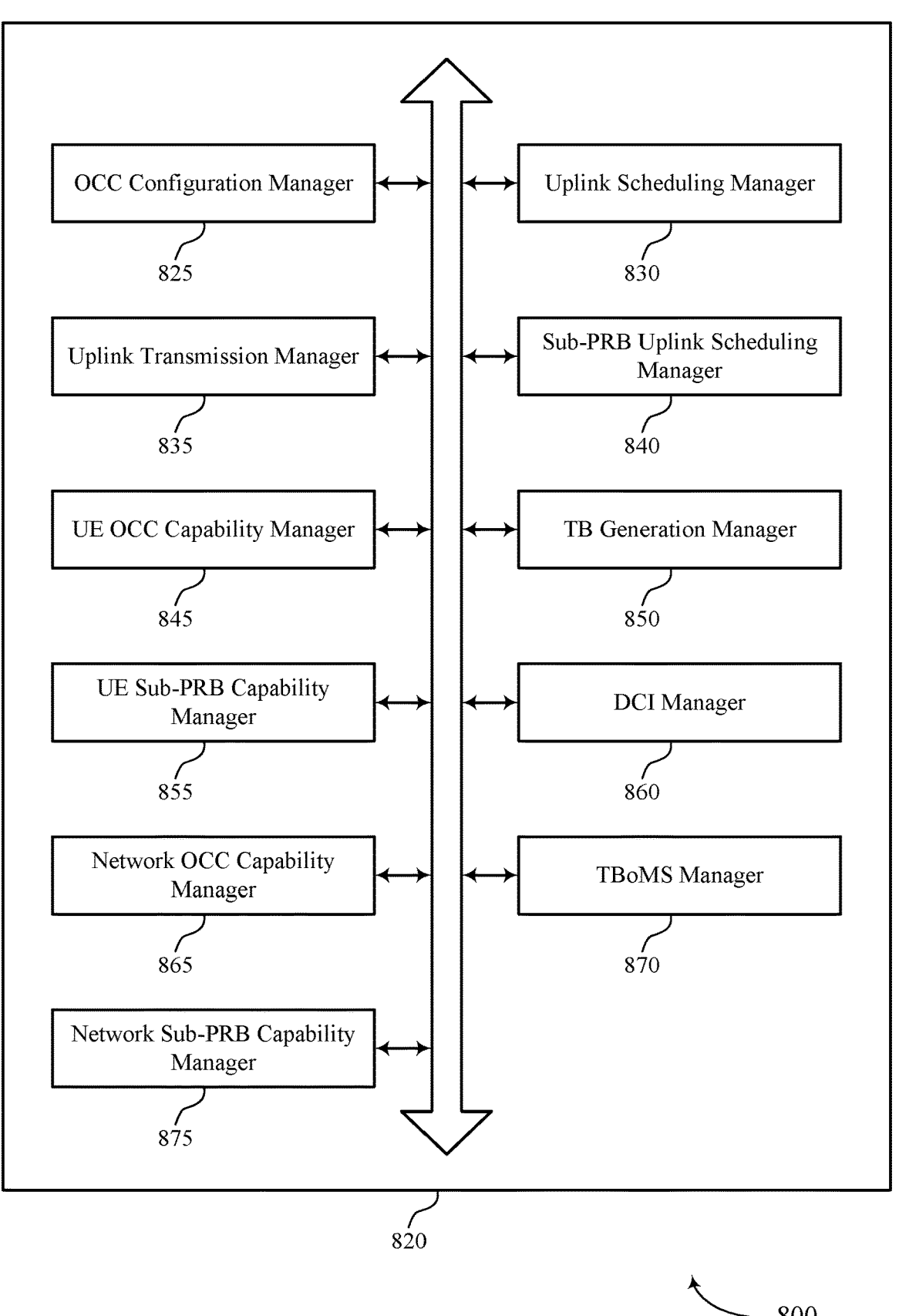
FIG. 8 shows a block diagram of a communications manager that supports TBS calculation for OCC and sub-PRB allocation for PUSCH in accordance with one or more aspects of the present disclosure.

FIG. 8 shows a block diagram 800 of a communications manager 820 that supports TBS calculation for OCC and sub-PRB allocation for PUSCH in accordance with one or more aspects of the present disclosure. The communications manager 820 may be an example of aspects of a communications manager 620, a communications manager 720, or both, as described herein. The communications manager 820, or various components thereof, may be an example of means for performing various aspects of TBS calculation for OCC and sub-PRB allocation for PUSCH as described herein. For example, the communications manager 820 may include a OCC configuration manager 825, an uplink scheduling manager 830, an uplink transmission manager 835, a sub-PRB uplink scheduling manager 840, a UE OCC capability manager 845, a TB generation manager 850, a UE sub-PRB capability manager 855, a DCI manager 860, a network OCC capability manager 865, a TBoMS manager 870, a network sub-PRB capability manager 875, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The OCC configuration manager 825 is capable of, configured to, or operable to support a means for receiving an indication of an OCC configuration associated with uplink shared channel transmissions for the UE, where the OCC configuration is associated with a spreading factor. The uplink scheduling manager 830 is capable of, configured to, or operable to support a means for receiving scheduling information for an uplink shared channel transmission. The uplink transmission manager 835 is capable of, configured to, or operable to support a means for performing the uplink shared channel transmission in accordance with the scheduling information and the OCC configuration, where a quantity of information bits associated with data transmission in the uplink shared channel transmission is based on the spreading factor.

In some examples, the UE OCC capability manager 845 is capable of, configured to, or operable to support a means for transmitting an indication of a capability of the UE to apply OCC to uplink shared channel transmissions for the UE, where reception of the indication of the OCC configuration is responsive to the indication of the capability of the UE.

In some examples, the network OCC capability manager 865 is capable of, configured to, or operable to support a means for receiving, from a network entity, an indication of a capability of the network entity to support reception of uplink shared channel transmissions encoded via OCC, where transmission of the indication of the capability of the UE is responsive to the indication of the capability of the network entity.

In some examples, the TB generation manager 850 is capable of, configured to, or operable to support a means for generating, in accordance with the OCC configuration, a TB having the quantity of information bits based on the spreading factor, where performing the uplink shared channel transmission includes transmitting the TB.

In some examples, the TB generation manager 850 is capable of, configured to, or operable to support a means for accounting for the spreading factor in a determination of a quantity of REs for the TB, where the quantity of information bits is based on the quantity of REs, and where the quantity of information bits being based on the spreading factor is due at least in part to the quantity of information bits being based on the quantity of REs.

In some examples, the TB generation manager 850 is capable of, configured to, or operable to support a means for accounting for the spreading factor in a determination of the quantity of information bits, where a determination of the quantity of information bits is further based on a determination of a quantity of REs for the TB, and where the quantity of REs is independent of the spreading factor.

In some examples, to support transmitting the TB, the TBoMS manager 870 is capable of, configured to, or operable to support a means for transmitting the TB over a set of multiple slots, where the scheduling information includes a TDRA that indicates the set of multiple slots.

In some examples, the OCC configuration indicates which rows or columns of a Hadamard matrix or a DFT matrix are associated with the UE.

In some examples, the OCC configuration manager 825 is capable of, configured to, or operable to support a means for receiving the indication of the OCC configuration via a first control message. In some examples, the uplink scheduling manager 830 is capable of, configured to, or operable to support a means for receiving the scheduling information via a second control message.

In some examples, the uplink scheduling manager 830 is capable of, configured to, or operable to support a means for receiving the indication of the OCC configuration and the scheduling information via a same control message.

Additionally, or alternatively, the communications manager 820 may support wireless communications in accordance with examples as disclosed herein. The sub-PRB uplink scheduling manager 840 is capable of, configured to, or operable to support a means for receiving scheduling information for an uplink shared channel transmission, where the scheduling information indicates an FDRA including a sub-PRB allocation. In some examples, the uplink transmission manager 835 is capable of, configured to, or operable to support a means for performing the uplink shared channel transmission in accordance with the scheduling information, where a quantity of information bits in the uplink shared channel transmission is based on a quantity of sub-carriers included in the sub-PRB allocation.

In some examples, the UE sub-PRB capability manager 855 is capable of, configured to, or operable to support a means for transmitting an indication of a capability of the UE to support sub-PRB allocations for uplink shared channel transmissions, where reception of the scheduling information is responsive to the indication of the capability of the UE.

In some examples, the network sub-PRB capability manager 875 is capable of, configured to, or operable to support a means for receiving, from a network entity, an indication of a capability of the network entity to support sub-PRB allocations for reception of uplink shared channel transmissions, where transmission of the indication of the capability of the UE is responsive to the indication of the capability of the network entity.

In some examples, the DCI manager 860 is capable of, configured to, or operable to support a means for receiving a control message indicating that the UE is to interpret one or more fields of a DCI format as indicative of the sub-PRB allocation, where the scheduling information is received via a DCI of the DCI format.

In some examples, the one or more fields include an FDRA field. In some examples, the FDRA field indicates a set of PRBs for the uplink shared channel transmission and one or more sub-carriers within each of the set of PRBs.

In some examples, the one or more fields include an FDRA field and at least one additional field. In some examples, the FDRA field indicates a set of PRBs for the uplink shared channel transmission. In some examples, the at least one additional field indicates one or more sub-carriers within each of the set of PRBs.

In some examples, the at least one additional field includes a modulation and coding scheme field, a transmit power command field, or a combination thereof.

In some examples, the DCI manager 860 is capable of, configured to, or operable to support a means for receiving the scheduling information via a DCI including a sub-PRB allocation field that indicates a set of PRBs for the uplink shared channel transmission and one or more sub-carriers within each of the set of PRBs.

In some examples, the DCI manager 860 is capable of, configured to, or operable to support a means for receiving the scheduling information via a DCI including a first field indicating a set of PRBs for the uplink shared channel transmission and a second field indicating one or more sub-carriers within each of the set of PRBs.

In some examples, the TB generation manager 850 is capable of, configured to, or operable to support a means for generating, in accordance with the scheduling information, a TB having the quantity of information bits based on the quantity of sub-carriers indicated in the sub-PRB allocation, where performing the uplink shared channel transmission includes transmitting the TB.

In some examples, the TB generation manager 850 is capable of, configured to, or operable to support a means for accounting for the quantity of sub-carriers in a determination of a quantity of REs for TB, where the quantity of information bits is based on the quantity of REs, and where the quantity of information bits being based on the quantity of sub-carriers is due at least in part to the quantity of information bits being based on the quantity of REs.

In some examples, to support transmitting the TB, the TBoMS manager 870 is capable of, configured to, or operable to support a means for transmitting the TB over a set of multiple slots, where the scheduling information includes a TDRA that indicates the set of multiple slots.

Figure 9:
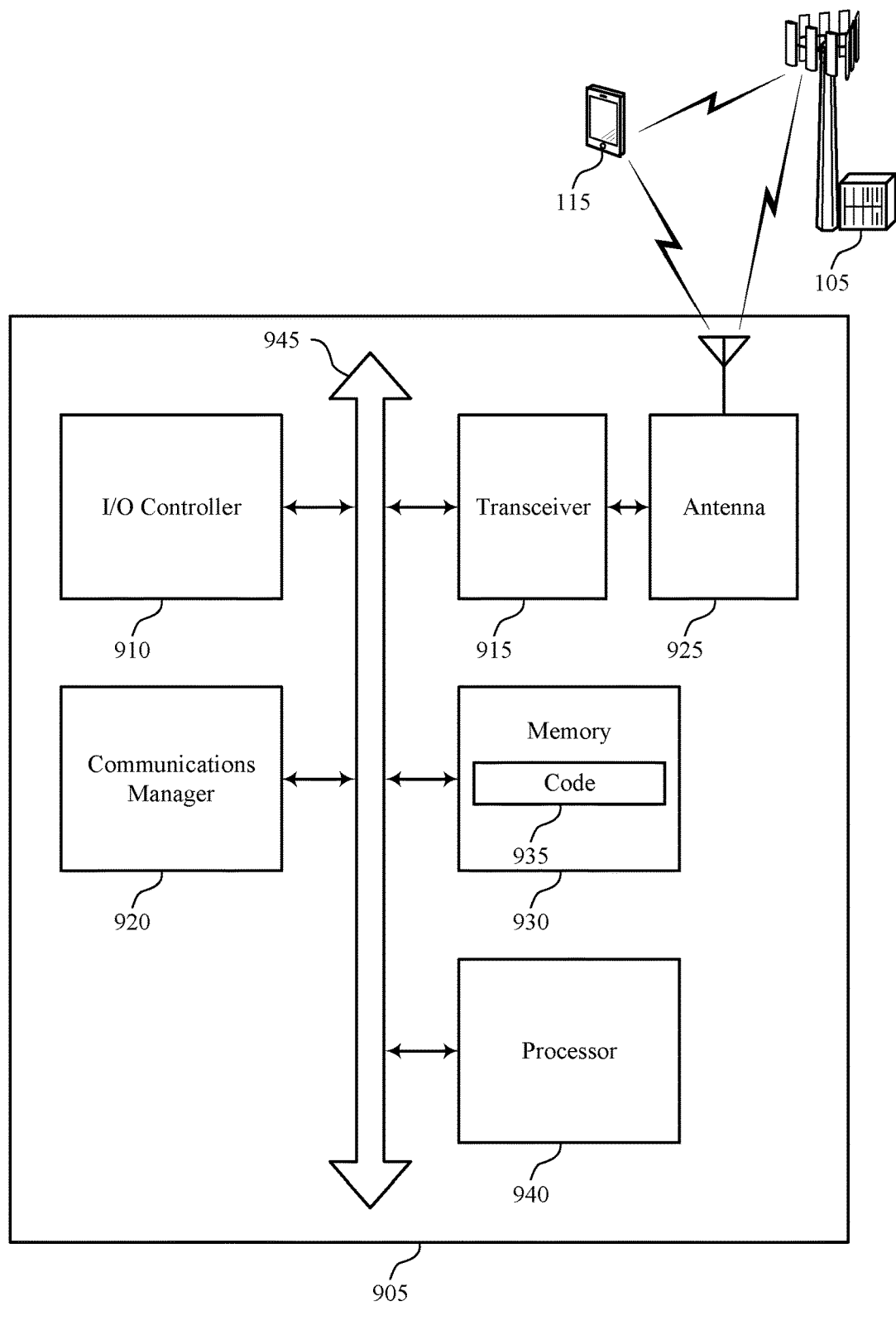
FIG. 9 shows a diagram of a system including a device that supports TBS calculation for OCC and sub-PRB allocation for PUSCH in accordance with one or more aspects of the present disclosure.

FIG. 9 shows a diagram of a system 900 including a device 905 that supports TBS calculation for OCC and sub-PRB allocation for PUSCH in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting TBS calculation for OCC and sub-PRB allocation for PUSCH). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. As such, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

The communications manager 920 may support wireless communications in accordance with examples as disclosed herein. For example, the communications manager 920 is capable of, configured to, or operable to support a means for receiving an indication of an OCC configuration associated with uplink shared channel transmissions for the UE, where the OCC configuration is associated with a spreading factor. The communications manager 920 is capable of, configured to, or operable to support a means for receiving scheduling information for an uplink shared channel transmission. The communications manager 920 is capable of, configured to, or operable to support a means for performing the uplink shared channel transmission in accordance with the scheduling information and the OCC configuration, where a quantity of information bits associated with data transmission in the uplink shared channel transmission is based on the spreading factor.

Additionally, or alternatively, the communications manager 920 may support wireless communications in accordance with examples as disclosed herein. For example, the communications manager 920 is capable of, configured to, or operable to support a means for receiving scheduling information for an uplink shared channel transmission, where the scheduling information indicates an FDRA including a sub-PRB allocation. The communications manager 920 is capable of, configured to, or operable to support a means for performing the uplink shared channel transmission in accordance with the scheduling information, where a quantity of information bits in the uplink shared channel transmission is based on a quantity of sub-carriers included in the sub-PRB allocation.

By including or configuring the communications manager 920 in accordance with examples as described herein, the device 905 may support techniques for improved communication reliability, more efficient utilization of communication resources, and improved coordination between devices.

In some examples, the communications manager 920 may be configured to perform various operations (e.g., receiving, monitoring, transmitting) using or otherwise in cooperation with the transceiver 915, the one or more antennas 925, or any combination thereof. For example, the communications manager 920 may be configured to receive or transmit messages or other signaling as described herein via the transceiver 915. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of TBS calculation for OCC and sub-PRB allocation for PUSCH as described herein, or the at least one processor 940 and the at least one memory 930 may be otherwise configured to, individually or collectively, perform or support such operations.

Figure 10:
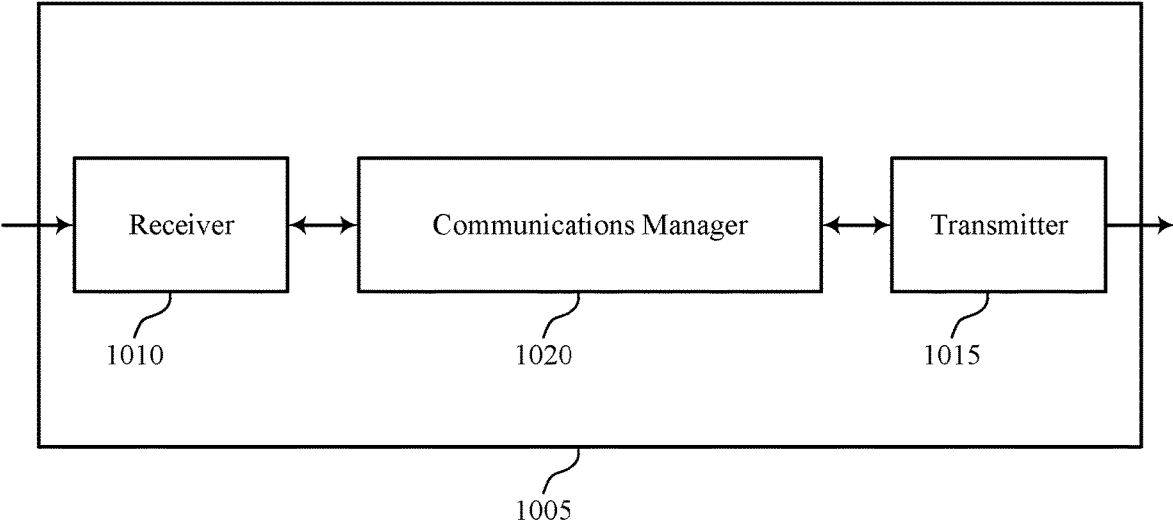
FIGS. 10 and 11 show block diagrams of devices that support TBS calculation for OCC and sub-PRB allocation for PUSCH in accordance with one or more aspects of the present disclosure.

FIG. 10 shows a block diagram 1000 of a device 1005 that supports TBS calculation for OCC and sub-PRB allocation for PUSCH in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of TBS calculation for OCC and sub-PRB allocation for PUSCH as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. For example, the communications manager 1020 is capable of, configured to, or operable to support a means for transmitting, to a UE, an indication of an OCC configuration associated with uplink shared channel transmissions for the UE, where the OCC configuration is associated with a spreading factor. The communications manager 1020 is capable of, configured to, or operable to support a means for transmitting, to the UE, scheduling information for an uplink shared channel transmission. The communications manager 1020 is capable of, configured to, or operable to support a means for receiving the uplink shared channel transmission from the UE in accordance with the scheduling information and the OCC configuration, where a quantity of information bits associated with data transmission in the uplink shared channel transmission is based on the spreading factor.

Additionally, or alternatively, the communications manager 1020 may support wireless communications in accordance with examples as disclosed herein. For example, the communications manager 1020 is capable of, configured to, or operable to support a means for transmitting, to a UE, scheduling information for an uplink shared channel transmission, where the scheduling information indicates an FDRA including a sub-PRB allocation. The communications manager 1020 is capable of, configured to, or operable to support a means for receiving the uplink shared channel transmission from the UE in accordance with the scheduling information, where a quantity of information bits in the uplink shared channel transmission is based on a quantity of sub-carriers included in the sub-PRB allocation.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for more efficient utilization of communication resources.

Figure 11:
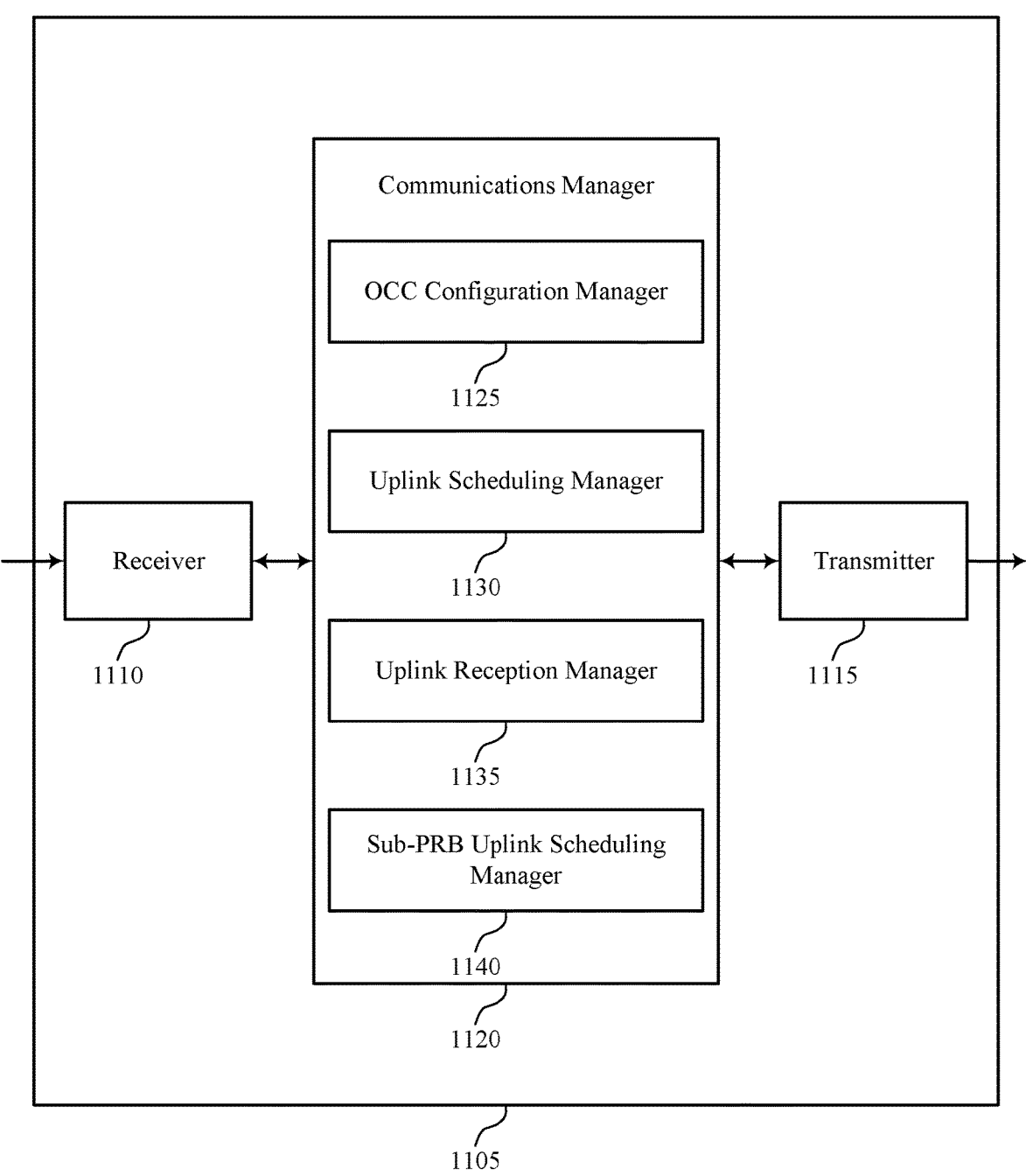

FIG. 11 shows a block diagram 1100 of a device 1105 that supports TBS calculation for OCC and sub-PRB allocation for PUSCH in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of TBS calculation for OCC and sub-PRB allocation for PUSCH as described herein. For example, the communications manager 1120 may include a OCC configuration manager 1125, an uplink scheduling manager 1130, an uplink reception manager 1135, a sub-PRB uplink scheduling manager 1140, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications in accordance with examples as disclosed herein. The OCC configuration manager 1125 is capable of, configured to, or operable to support a means for transmitting, to a UE, an indication of an OCC configuration associated with uplink shared channel transmissions for the UE, where the OCC configuration is associated with a spreading factor. The uplink scheduling manager 1130 is capable of, configured to, or operable to support a means for transmitting, to the UE, scheduling information for an uplink shared channel transmission. The uplink reception manager 1135 is capable of, configured to, or operable to support a means for receiving the uplink shared channel transmission from the UE in accordance with the scheduling information and the OCC configuration, where a quantity of information bits associated with data transmission in the uplink shared channel transmission is based on the spreading factor.

Additionally, or alternatively, the communications manager 1120 may support wireless communications in accordance with examples as disclosed herein. The sub-PRB uplink scheduling manager 1140 is capable of, configured to, or operable to support a means for transmitting, to a UE, scheduling information for an uplink shared channel transmission, where the scheduling information indicates an FDRA including a sub-PRB allocation. The uplink reception manager 1135 is capable of, configured to, or operable to support a means for receiving the uplink shared channel transmission from the UE in accordance with the scheduling information, where a quantity of information bits in the uplink shared channel transmission is based on a quantity of sub-carriers included in the sub-PRB allocation.

Figure 12:
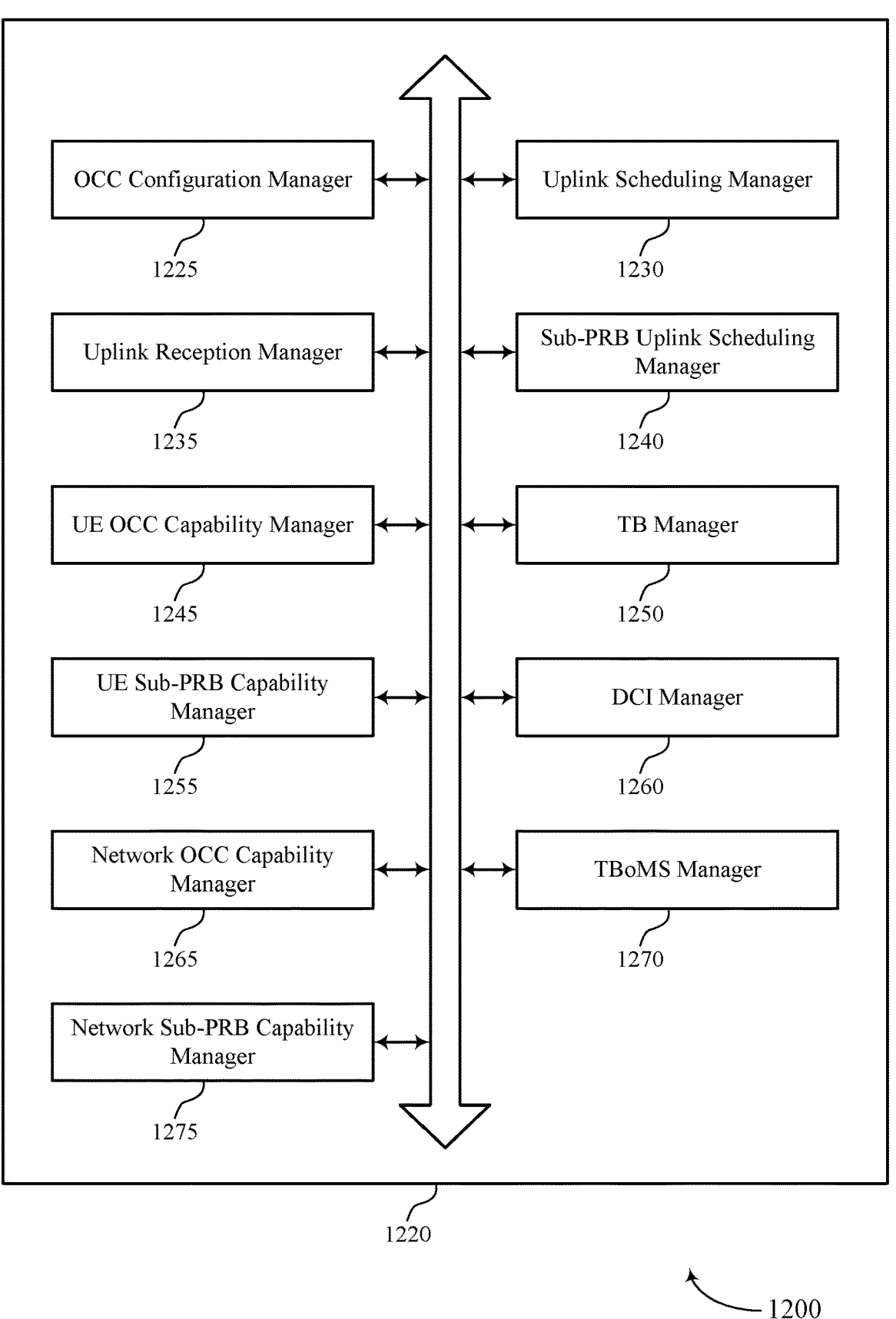
FIG. 12 shows a block diagram of a communications manager that supports TBS calculation for OCC and sub-PRB allocation for PUSCH in accordance with one or more aspects of the present disclosure.

FIG. 12 shows a block diagram 1200 of a communications manager 1220 that supports TBS calculation for OCC and sub-PRB allocation for PUSCH in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of TBS calculation for OCC and sub-PRB allocation for PUSCH as described herein. For example, the communications manager 1220 may include a OCC configuration manager 1225, an uplink scheduling manager 1230, an uplink reception manager 1235, a sub-PRB uplink scheduling manager 1240, a UE OCC capability manager 1245, a TB manager 1250, a UE sub-PRB capability manager 1255, a DCI manager 1260, a network OCC capability manager 1265, a TBoMS manager 1270, a network sub-PRB capability manager 1275, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications in accordance with examples as disclosed herein. The OCC configuration manager 1225 is capable of, configured to, or operable to support a means for transmitting, to a UE, an indication of an OCC configuration associated with uplink shared channel transmissions for the UE, where the OCC configuration is associated with a spreading factor. The uplink scheduling manager 1230 is capable of, configured to, or operable to support a means for transmitting, to the UE, scheduling information for an uplink shared channel transmission. The uplink reception manager 1235 is capable of, configured to, or operable to support a means for receiving the uplink shared channel transmission from the UE in accordance with the scheduling information and the OCC configuration, where a quantity of information bits associated with data transmission in the uplink shared channel transmission is based on the spreading factor.

In some examples, the UE OCC capability manager 1245 is capable of, configured to, or operable to support a means for receiving, from the UE, an indication of a capability of the UE to apply OCC to uplink shared channel transmissions for the UE, where transmission of the indication of the OCC configuration is responsive to the indication of the capability of the UE.

In some examples, the network OCC capability manager 1265 is capable of, configured to, or operable to support a means for transmitting, to the UE, an indication of a capability of the network entity to support reception of uplink shared channel transmissions encoded via OCC, where reception of the indication of the capability of the UE is responsive to the indication of the capability of the network entity.

In some examples, to support receiving the uplink shared channel transmission, the TB manager 1250 is capable of, configured to, or operable to support a means for receiving, in accordance with the OCC configuration, a TB having the quantity of information bits based on the spreading factor.

In some examples, a quantity of REs for the TB accounts for the spreading factor. In some examples, the quantity of information bits is based on the quantity of REs. In some examples, the quantity of information bits being based on the spreading factor is due at least in part to the quantity of information bits being based on the quantity of REs.

In some examples, the quantity of information bits accounts for the spreading factor. In some examples, the quantity of information bits is further based on a determination of a quantity of REs for the TB. In some examples, the quantity of REs is independent of the spreading factor.

In some examples, to support receiving the TB, the TBoMS manager 1270 is capable of, configured to, or operable to support a means for receiving the TB over a set of multiple slots, where the scheduling information includes a TDRA that indicates the set of multiple slots.

In some examples, the OCC configuration indicates which rows or columns of a Hadamard matrix or a DFT matrix are associated with the UE.

In some examples, the OCC configuration manager 1225 is capable of, configured to, or operable to support a means for transmitting the indication of the OCC configuration via a first control message. In some examples, the uplink scheduling manager 1230 is capable of, configured to, or operable to support a means for transmitting the scheduling information via a second control message.

In some examples, the uplink scheduling manager 1230 is capable of, configured to, or operable to support a means for transmitting the indication of the OCC configuration and the scheduling information via a same control message.

Additionally, or alternatively, the communications manager 1220 may support wireless communications in accordance with examples as disclosed herein. The sub-PRB uplink scheduling manager 1240 is capable of, configured to, or operable to support a means for transmitting, to a UE, scheduling information for an uplink shared channel transmission, where the scheduling information indicates an FDRA including a sub-PRB allocation. In some examples, the uplink reception manager 1235 is capable of, configured to, or operable to support a means for receiving the uplink shared channel transmission from the UE in accordance with the scheduling information, where a quantity of information bits in the uplink shared channel transmission is based on a quantity of sub-carriers included in the sub-PRB allocation.

In some examples, the UE sub-PRB capability manager 1255 is capable of, configured to, or operable to support a means for receiving, from the UE, an indication of a capability of the UE to support sub-PRB allocations for uplink shared channel transmissions, where transmission of the scheduling information is responsive to the indication of the capability of the UE.

In some examples, the network sub-PRB capability manager 1275 is capable of, configured to, or operable to support a means for transmitting, to the UE, an indication of a capability of the network entity to support sub-PRB allocations for reception of uplink shared channel transmissions, where reception of the indication of the capability of the UE is responsive to the indication of the capability of the network entity.

In some examples, the DCI manager 1260 is capable of, configured to, or operable to support a means for transmitting, to the UE, a control message indicating that the UE is to interpret one or more fields of a DCI format as indicative of the sub-PRB allocation, where the scheduling information is transmitted via a DCI of the DCI format.

In some examples, the one or more fields include an FDRA field. In some examples, the FDRA field indicates a set of PRBs for the uplink shared channel transmission and one or more sub-carriers within each of the set of PRBs.

In some examples, the one or more fields include an FDRA field and at least one additional field. In some examples, the FDRA field indicates a set of PRBs for the uplink shared channel transmission. In some examples, the at least one additional field indicates one or more sub-carriers within each of the set of PRBs.

In some examples, the at least one additional field includes a modulation and coding scheme field, a transmit power command field, or a combination thereof.

In some examples, the DCI manager 1260 is capable of, configured to, or operable to support a means for transmitting the scheduling information via a DCI including a sub-PRB allocation field that indicates a set of PRBs for the uplink shared channel transmission and one or more sub-carriers within each of the set of PRBs.

In some examples, the DCI manager 1260 is capable of, configured to, or operable to support a means for transmitting the scheduling information via a DCI including a first field indicating a set of PRBs for the uplink shared channel transmission and a second field indicating one or more sub-carriers within each of the set of PRBs.

In some examples, to support receiving the uplink shared channel transmission, the TB manager 1250 is capable of, configured to, or operable to support a means for receiving a TB having the quantity of information bits based on the quantity of sub-carriers indicated in the sub-PRB allocation.

In some examples, a quantity of REs for TB accounts for the quantity of sub-carriers. In some examples, the quantity of information bits is based on the quantity of REs. In some examples, the quantity of information bits being based on the quantity of sub-carriers is due at least in part to the quantity of information bits being based on the quantity of REs.

In some examples, to support receiving the TB, the TBoMS manager 1270 is capable of, configured to, or operable to support a means for receiving the TB over a set of multiple slots, where the scheduling information includes a TDRA that indicates the set of multiple slots.

Figure 13:
FIG. 13 shows a diagram of a system including a device that supports TBS calculation for OCC and sub-PRB allocation for PUSCH in accordance with one or more aspects of the present disclosure.

FIG. 13 shows a diagram of a system 1300 including a device 1305 that supports TBS calculation for OCC and sub-PRB allocation for PUSCH in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting TBS calculation for OCC and sub-PRB allocation for PUSCH). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. As such, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105 and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications in accordance with examples as disclosed herein. For example, the communications manager 1320 is capable of, configured to, or operable to support a means for transmitting, to a UE, an indication of an OCC configuration associated with uplink shared channel transmissions for the UE, where the OCC configuration is associated with a spreading factor. The communications manager 1320 is capable of, configured to, or operable to support a means for transmitting, to the UE, scheduling information for an uplink shared channel transmission. The communications manager 1320 is capable of, configured to, or operable to support a means for receiving the uplink shared channel transmission from the UE in accordance with the scheduling information and the OCC configuration, where a quantity of information bits associated with data transmission in the uplink shared channel transmission is based on the spreading factor.

Additionally, or alternatively, the communications manager 1320 may support wireless communications in accordance with examples as disclosed herein. For example, the communications manager 1320 is capable of, configured to, or operable to support a means for transmitting, to a UE, scheduling information for an uplink shared channel transmission, where the scheduling information indicates an FDRA including a sub-PRB allocation. The communications manager 1320 is capable of, configured to, or operable to support a means for receiving the uplink shared channel transmission from the UE in accordance with the scheduling information, where a quantity of information bits in the uplink shared channel transmission is based on a quantity of sub-carriers included in the sub-PRB allocation.

By including or configuring the communications manager 1320 in accordance with examples as described herein, the device 1305 may support techniques for improved communication reliability, more efficient utilization of communication resources, and improved coordination between devices.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. For example, the communications manager 1320 may be configured to receive or transmit messages or other signaling as described herein via the transceiver 1310. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of TBS calculation for OCC and sub-PRB allocation for PUSCH as described herein, or the at least one processor 1335 and the at least one memory 1325 may be otherwise configured to, individually or collectively, perform or support such operations.

FIG. 14 shows a flowchart illustrating a method 1400 that supports TBS calculation for OCC and sub-PRB allocation for PUSCH in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving an indication of an OCC configuration associated with uplink shared channel transmissions for the UE, where the OCC configuration is associated with a spreading factor. The operations of block 1405 may be performed in accordance with examples as disclosed herein. In some examples, aspects of the operations of 1405 may be performed by a OCC configuration manager 825 as described with reference to FIG. 8. Additionally or alternatively, means for performing 1405 may, but not necessarily, include, for example, antenna 925, transceiver 915, communications manager 920, memory 930 (including code 935), processor 940 and/or bus 945.

At 1410, the method may include receiving scheduling information for an uplink shared channel transmission. The operations of block 1410 may be performed in accordance with examples as disclosed herein. In some examples, aspects of the operations of 1410 may be performed by an uplink scheduling manager 830 as described with reference to FIG. 8. Additionally or alternatively, means for performing 1410 may, but not necessarily, include, for example, antenna 925, transceiver 915, communications manager 920, memory 930 (including code 935), processor 940 and/or bus 945.

At 1415, the method may include performing the uplink shared channel transmission in accordance with the scheduling information and the OCC configuration, where a quantity of information bits associated with data transmission in the uplink shared channel transmission is based on the spreading factor. The operations of block 1415 may be performed in accordance with examples as disclosed herein. In some examples, aspects of the operations of 1415 may be performed by an uplink transmission manager 835 as described with reference to FIG. 8. Additionally or alternatively, means for performing 1415 may, but not necessarily, include, for example, antenna 925, transceiver 915, communications manager 920, memory 930 (including code 935), processor 940 and/or bus 945.

FIG. 15 shows a flowchart illustrating a method 1500 that supports TBS calculation for OCC and sub-PRB allocation for PUSCH in accordance with aspects of the present disclosure. The operations of the method 1500 may be implemented by a network entity or its components as described herein. For example, the operations of the method 1500 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a UE, an indication of an OCC configuration associated with uplink shared channel transmissions for the UE, where the OCC configuration is associated with a spreading factor. The operations of block 1505 may be performed in accordance with examples as disclosed herein. In some examples, aspects of the operations of 1505 may be performed by a OCC configuration manager 1225 as described with reference to FIG. 12. Additionally or alternatively, means for performing 1505 may, but not necessarily, include, for example, antenna 1315, transceiver 1310, communications manager 1320, memory 1325 (including code 1330), processor 1335 and/or bus 1340.

At 1510, the method may include transmitting, to the UE, scheduling information for an uplink shared channel transmission. The operations of block 1510 may be performed in accordance with examples as disclosed herein. In some examples, aspects of the operations of 1510 may be performed by an uplink scheduling manager 1230 as described with reference to FIG. 12. Additionally or alternatively, means for performing 1510 may, but not necessarily, include, for example, antenna 1315, transceiver 1310, communications manager 1320, memory 1325 (including code 1330), processor 1335 and/or bus 1340.

At 1515, the method may include receiving the uplink shared channel transmission from the UE in accordance with the scheduling information and the OCC configuration, where a quantity of information bits associated with data transmission in the uplink shared channel transmission is based on the spreading factor. The operations of block 1515 may be performed in accordance with examples as disclosed herein. In some examples, aspects of the operations of 1515 may be performed by an uplink reception manager 1235 as described with reference to FIG. 12. Additionally or alternatively, means for performing 1515 may, but not necessarily, include, for example, antenna 1315, transceiver 1310, communications manager 1320, memory 1325 (including code 1330), processor 1335 and/or bus 1340.

FIG. 16 shows a flowchart illustrating a method 1600 that supports TBS calculation for OCC and sub-PRB allocation for PUSCH in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving scheduling information for an uplink shared channel transmission, where the scheduling information indicates an FDRA including a sub-PRB allocation. The operations of block 1605 may be performed in accordance with examples as disclosed herein. In some examples, aspects of the operations of 1605 may be performed by a sub-PRB uplink scheduling manager 840 as described with reference to FIG. 8. Additionally or alternatively, means for performing 1605 may, but not necessarily, include, for example, antenna 925, transceiver 915, communications manager 920, memory 930 (including code 935), processor 940 and/or bus 945.

At 1610, the method may include performing the uplink shared channel transmission in accordance with the scheduling information, where a quantity of information bits in the uplink shared channel transmission is based on a quantity of sub-carriers included in the sub-PRB allocation. The operations of block 1610 may be performed in accordance with examples as disclosed herein. In some examples, aspects of the operations of 1610 may be performed by an uplink transmission manager 835 as described with reference to FIG. 8. Additionally or alternatively, means for performing 1610 may, but not necessarily, include, for example, antenna 925, transceiver 915, communications manager 920, memory 930 (including code 935), processor 940 and/or bus 945.

FIG. 17 shows a flowchart illustrating a method 1700 that supports TBS calculation for OCC and sub-PRB allocation for PUSCH in accordance with aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE, scheduling information for an uplink shared channel transmission, where the scheduling information indicates an FDRA including a sub-PRB allocation. The operations of block 1705 may be performed in accordance with examples as disclosed herein. In some examples, aspects of the operations of 1705 may be performed by a sub-PRB uplink scheduling manager 1240 as described with reference to FIG. 12. Additionally or alternatively, means for performing 1705 may, but not necessarily, include, for example, antenna 1315, transceiver 1310, communications manager 1320, memory 1325 (including code 1330), processor 1335 and/or bus 1340.

At 1710, the method may include receiving the uplink shared channel transmission from the UE in accordance with the scheduling information, where a quantity of information bits in the uplink shared channel transmission is based on a quantity of sub-carriers included in the sub-PRB allocation. The operations of block 1710 may be performed in accordance with examples as disclosed herein. In some examples, aspects of the operations of 1710 may be performed by an uplink reception manager 1235 as described with reference to FIG. 12. Additionally or alternatively, means for performing 1710 may, but not necessarily, include, for example, antenna 1315, transceiver 1310, communications manager 1320, memory 1325 (including code 1330), processor 1335 and/or bus 1340.

The Following Provides an Overview of Aspects of the Present Disclosure:

Aspect 1: A method for wireless communications at a UE, comprising: receiving an indication of an OCC configuration associated with uplink shared channel transmissions for the UE, wherein the OCC configuration is associated with a spreading factor; receiving scheduling information for an uplink shared channel transmission; and performing the uplink shared channel transmission in accordance with the scheduling information and the OCC configuration, wherein a quantity of information bits associated with data transmission in the uplink shared channel transmission is based at least in part on the spreading factor.

Aspect 2: The method of aspect 1, further comprising: transmitting an indication of a capability of the UE to apply OCC to uplink shared channel transmissions for the UE, wherein reception of the indication of the OCC configuration is responsive to the indication of the capability of the UE.

Aspect 3: The method of aspect 2, further comprising: receiving, from a network entity, an indication of a capability of the network entity to support reception of uplink shared channel transmissions encoded via OCC, wherein transmission of the indication of the capability of the UE is responsive to the indication of the capability of the network entity.

Aspect 4: The method of any of aspects 1 through 3, further comprising: generating, in accordance with the OCC configuration, a TB having the quantity of information bits based at least in part on the spreading factor, wherein performing the uplink shared channel transmission comprises transmitting the TB.

Aspect 5: The method of aspect 4, further comprising: accounting for the spreading factor in a determination of a quantity of REs for the TB, wherein the quantity of information bits is based at least in part on the quantity of REs, and wherein the quantity of information bits being based at least in part on the spreading factor is due at least in part to the quantity of information bits being based at least in part on the quantity of REs.

Aspect 6: The method of aspect 4, further comprising: accounting for the spreading factor in a determination of the quantity of information bits, wherein a determination of the quantity of information bits is further based at least in part on a determination of a quantity of REs for the TB, and wherein the quantity of REs is independent of the spreading factor.

Aspect 7: The method of any of aspects 4 through 6, wherein transmitting the TB comprises: transmitting the TB over a set of multiple slots, wherein the scheduling information comprises a time domain resource allocation that indicates the set of multiple slots.

Aspect 8: The method of any of aspects 1 through 7, wherein the OCC configuration indicates which rows or columns of a Hadamard matrix or a discrete Fourier transform matrix are associated with the UE.

Aspect 9: The method of any of aspects 1 through 8, further comprising: receiving the indication of the OCC configuration via a first control message; and receiving the scheduling information via a second control message.

Aspect 10: The method of any of aspects 1 through 8, further comprising: receiving the indication of the OCC configuration and the scheduling information via a same control message.

Aspect 11: A method for wireless communications at a network entity, comprising: transmitting, to a UE, an indication of an OCC configuration associated with uplink shared channel transmissions for the UE, wherein the OCC configuration is associated with a spreading factor; transmitting, to the UE, scheduling information for an uplink shared channel transmission; and receiving the uplink shared channel transmission from the UE in accordance with the scheduling information and the OCC configuration, wherein a quantity of information bits associated with data transmission in the uplink shared channel transmission is based at least in part on the spreading factor.

Aspect 12: The method of aspect 11, further comprising: receiving, from the UE, an indication of a capability of the UE to apply OCC to uplink shared channel transmissions for the UE, wherein transmission of the indication of the OCC configuration is responsive to the indication of the capability of the UE.

Aspect 13: The method of aspect 12, further comprising: transmitting, to the UE, an indication of a capability of the network entity to support reception of uplink shared channel transmissions encoded via OCC, wherein reception of the indication of the capability of the UE is responsive to the indication of the capability of the network entity.

Aspect 14: The method of any of aspects 11 through 13, wherein receiving the uplink shared channel transmission comprises: receiving, in accordance with the OCC configuration, a TB having the quantity of information bits based at least in part on the spreading factor.

Aspect 15: The method of aspect 14, wherein a quantity of REs for the TB accounts for the spreading factor, the quantity of information bits is based at least in part on the quantity of REs, and the quantity of information bits being based at least in part on the spreading factor is due at least in part to the quantity of information bits being based at least in part on the quantity of REs.

Aspect 16: The method of aspect 14, wherein the quantity of information bits accounts for the spreading factor, the quantity of information bits is further based at least in part on a determination of a quantity of REs for the TB, and the quantity of REs is independent of the spreading factor.

Aspect 17: The method of any of aspects 14 through 16, wherein receiving the TB comprises: receiving the TB over a set of multiple slots, wherein the scheduling information comprises a time domain resource allocation that indicates the set of multiple slots.

Aspect 18: The method of any of aspects 11 through 17, wherein the OCC configuration indicates which rows or columns of a Hadamard matrix or a discrete Fourier transform matrix are associated with the UE.

Aspect 19: The method of any of aspects 11 through 18, further comprising: transmitting the indication of the OCC configuration via a first control message; and transmitting the scheduling information via a second control message.

Aspect 20: The method of any of aspects 11 through 18, further comprising: transmitting the indication of the OCC configuration and the scheduling information via a same control message.

Aspect 21: A method for wireless communications at a UE, comprising: receiving scheduling information for an uplink shared channel transmission, wherein the scheduling information indicates an FDRA comprising a sub-PRB allocation; and performing the uplink shared channel transmission in accordance with the scheduling information, wherein a quantity of information bits in the uplink shared channel transmission is based at least in part on a quantity of sub-carriers included in the sub-PRB allocation.

Aspect 22: The method of aspect 21, further comprising: transmitting an indication of a capability of the UE to support sub-PRB allocations for uplink shared channel transmissions, wherein reception of the scheduling information is responsive to the indication of the capability of the UE.

Aspect 23: The method of aspect 22, further comprising: receiving, from a network entity, an indication of a capability of the network entity to support sub-PRB allocations for reception of uplink shared channel transmissions, wherein transmission of the indication of the capability of the UE is responsive to the indication of the capability of the network entity.

Aspect 24: The method of any of aspects 21 through 23, further comprising: receiving a control message indicating to interpret one or more fields of a DCI format as indicative of the sub-PRB allocation, wherein the scheduling information is received via a DCI of the DCI format.

Aspect 25: The method of aspect 24, wherein the one or more fields comprise an FDRA field, and the FDRA field indicates a set of PRBs for the uplink shared channel transmission and one or more subcarriers within each of the set of PRBs.

Aspect 26: The method of any of aspects 24 through 25, wherein the one or more fields comprise an FDRA field and at least one additional field, the FDRA field indicates a set of PRBs for the uplink shared channel transmission, and the at least one additional field indicates one or more subcarriers within each of the set of PRBs.

Aspect 27: The method of aspect 26, wherein the at least one additional field comprises a modulation and coding scheme field, a transmit power command field, or a combination thereof.

Aspect 28: The method of any of aspects 21 through 23, further comprising: receiving the scheduling information via a DCI comprising a sub-PRB allocation field that indicates a set of PRBs for the uplink shared channel transmission and one or more subcarriers within each of the set of PRBs.

Aspect 29: The method of any of aspects 21 through 23, further comprising: receiving the scheduling information via a DCI comprising a first field indicating a set of PRBs for the uplink shared channel transmission and a second field indicating one or more subcarriers within each of the set of PRBs.

Aspect 30: The method of any of aspects 21 through 29, further comprising: generating, in accordance with the scheduling information, a TB having the quantity of information bits based at least in part on the quantity of sub-carriers indicated in the sub-PRB allocation, wherein performing the uplink shared channel transmission comprises transmitting the TB.

Aspect 31: The method of aspect 30, further comprising: accounting for the quantity of sub-carriers in a determination of a quantity of REs for TB, wherein the quantity of information bits is based at least in part on the quantity of REs, and wherein the quantity of information bits being based at least in part on the quantity of sub-carriers is due at least in part to the quantity of information bits being based at least in part on the quantity of REs.

Aspect 32: The method of any of aspects 30 through 31, wherein transmitting the TB comprises: transmitting the TB over a set of multiple slots, wherein the scheduling information comprises a time domain resource allocation that indicates the set of multiple slots.

Aspect 33: A method for wireless communications at a network entity, comprising: transmitting, to a UE, scheduling information for an uplink shared channel transmission, wherein the scheduling information indicates an FDRA comprising a sub-PRB allocation; and receiving the uplink shared channel transmission from the UE in accordance with the scheduling information, wherein a quantity of information bits in the uplink shared channel transmission is based at least in part on a quantity of sub-carriers included in the sub-PRB allocation.

Aspect 34: The method of aspect 33, further comprising: receiving, from the UE, an indication of a capability of the UE to support sub-PRB allocations for uplink shared channel transmissions, wherein transmission of the scheduling information is responsive to the indication of the capability of the UE.

Aspect 35: The method of aspect 34, further comprising: transmitting, to the UE, an indication of a capability of the network entity to support sub-PRB allocations for reception of uplink shared channel transmissions, wherein reception of the indication of the capability of the UE is responsive to the indication of the capability of the network entity.

Aspect 36: The method of any of aspects 33 through 35, further comprising: transmitting, to the UE, a control message indicating to interpret one or more fields of a DCI format as indicative of the sub-PRB allocation, wherein the scheduling information is transmitted via a DCI of the DCI format.

Aspect 37: The method of aspect 36, wherein the one or more fields comprise an FDRA field, and the FDRA field indicates a set of PRBs for the uplink shared channel transmission and one or more subcarriers within each of the set of PRBs.

Aspect 38: The method of any of aspects 36 through 37, wherein the one or more fields comprise an FDRA field and at least one additional field, the FDRA field indicates a set of PRBs for the uplink shared channel transmission, and the at least one additional field indicates one or more subcarriers within each of the set of PRBs.

Aspect 39: The method of aspect 38, wherein the at least one additional field comprises a modulation and coding scheme field, a transmit power command field, or a combination thereof.

Aspect 40: The method of any of aspects 33 through 35, further comprising: transmitting the scheduling information via a DCI comprising a sub-PRB allocation field that indicates a set of PRBs for the uplink shared channel transmission and one or more subcarriers within each of the set of PRBs.

Aspect 41: The method of any of aspects 33 through 35, further comprising: transmitting the scheduling information via a DCI comprising a first field indicating a set of PRBs for the uplink shared channel transmission and a second field indicating one or more subcarriers within each of the set of PRBs.

Aspect 42: The method of any of aspects 33 through 41, wherein receiving the uplink shared channel transmission comprises: receiving a TB having the quantity of information bits based at least in part on the quantity of sub-carriers indicated in the sub-PRB allocation.

Aspect 43: The method of aspect 42, wherein a quantity of REs for TB accounts for the quantity of sub-carriers, the quantity of information bits is based at least in part on the quantity of REs, and the quantity of information bits being based at least in part on the quantity of sub-carriers is due at least in part to the quantity of information bits being based at least in part on the quantity of REs.

Aspect 44: The method of any of aspects 42 through 43, wherein receiving the TB comprises: receiving the TB over a set of multiple slots, wherein the scheduling information comprises a time domain resource allocation that indicates the set of multiple slots.

Aspect 45: An apparatus comprising a memory, transceiver, and at least one processor coupled with the memory and the transceiver, the at least one processor configured to cause the apparatus to perform a method of any of aspects 1 through 10.

Aspect 46: A UE for wireless communications, comprising at least one means for performing a method of any of aspects 1 through 10.

Aspect 47: A non-transitory computer-readable medium storing code for wireless communications, the code comprising instructions executable by a processor to perform a method of any of aspects 1 through 10.

Aspect 48: An apparatus comprising a memory and at least one processor coupled with the memory, the at least one processor configured to cause the apparatus to perform a method of any of aspects 11 through 20.

Aspect 49: A network entity for wireless communications, comprising at least one means for performing a method of any of aspects 11 through 20.

Aspect 50: A non-transitory computer-readable medium storing code for wireless communications, the code comprising instructions executable by a processor to perform a method of any of aspects 11 through 20.

Aspect 51: An apparatus comprising a memory, transceiver, and at least one processor coupled with the memory and the transceiver, the at least one processor configured to cause the apparatus to perform a method of any of aspects 21 through 32.

Aspect 52: A UE for wireless communications, comprising at least one means for performing a method of any of aspects 21 through 32.

Aspect 53: A non-transitory computer-readable medium storing code for wireless communications, the code comprising instructions executable by a processor to perform a method of any of aspects 21 through 32.

Aspect 54: An apparatus comprising a memory and at least one processor coupled with the memory, the at least one processor configured to cause the apparatus to perform a method of any of aspects 33 through 44.

Aspect 55: A network entity for wireless communications, comprising at least one means for performing a method of any of aspects 33 through 44.

Aspect 56: A non-transitory computer-readable medium storing code for wireless communications, the code comprising instructions executable by a processor to perform a method of any of aspects 33 through 44.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory)

and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication comprising:
memory;
a transceiver; and
at least one processor of a user equipment (UE), the at least one processor coupled with the memory and the transceiver, and the at least one processor configured to cause the apparatus to:
receive, via the transceiver, an indication of an orthogonal cover code configuration associated with uplink shared channel transmissions for the UE, wherein the orthogonal cover code configuration is associated with a spreading factor that is proportional to a quantity of UEs configured with the orthogonal cover code configuration;
receive, via the transceiver, scheduling information for an uplink shared channel transmission; and
perform, via the transceiver, the uplink shared channel transmission in accordance with the scheduling information and the orthogonal cover code configuration, wherein a quantity of information bits associated with data transmission in the uplink shared channel transmission is based at least in part on the spreading factor that is proportional to the quantity of UEs.

2. The apparatus of claim 1, the at least one processor further configured to cause the apparatus to:
transmit, via the transceiver, an indication of a capability of the UE to apply orthogonal cover coding to uplink shared channel transmissions for the UE, wherein reception of the indication of the orthogonal cover code configuration is responsive to the indication of the capability of the UE.

3. The apparatus of claim 2, the at least one processor further configured to cause the apparatus to:
receive, from a network entity via the transceiver, an indication of a capability of the network entity to support reception of uplink shared channel transmissions encoded via orthogonal cover coding, wherein transmission of the indication of the capability of the UE is responsive to the indication of the capability of the network entity.

4. The apparatus of claim 1, the at least one processor further configured to cause the apparatus to:
generate, in accordance with the orthogonal cover code configuration, a transport block having the quantity of information bits based at least in part on the spreading factor, wherein performing the uplink shared channel transmission comprises transmitting the transport block.

5. The apparatus of claim 4, the at least one processor further configured to cause the apparatus to:
account for the spreading factor in a determination of a quantity of resource elements for the transport block, wherein the quantity of information bits is based at least in part on the quantity of resource elements, and wherein the quantity of information bits being based at least in part on the spreading factor is due at least in part to the quantity of information bits being based at least in part on the quantity of resource elements.

6. The apparatus of claim 4, the at least one processor further configured to cause the apparatus to:
account for the spreading factor in a determination of the quantity of information bits, wherein the determination of the quantity of information bits is further based at least in part on a determination of a quantity of resource elements for the transport block, and wherein the quantity of resource elements is independent of the spreading factor.

7. The apparatus of claim 4, wherein, to transmit the transport block, the at least one processor is further configured to cause the apparatus to:
transmit, via the transceiver, the transport block over a set of multiple slots, wherein the scheduling information comprises a time domain resource allocation that indicates the set of multiple slots.

8. The apparatus of claim 1, wherein the orthogonal cover code configuration indicates which rows or columns of a Hadamard matrix or a discrete Fourier transform matrix are associated with the UE.

9. The apparatus of claim 1, the at least one processor further configured to cause the apparatus to:
receive, via the transceiver, the indication of the orthogonal cover code configuration via a first control message; and
receive, via the transceiver, the scheduling information via a second control message.

10. The apparatus of claim 1, the at least one processor further configured to cause the apparatus to:
receive, via the transceiver, the indication of the orthogonal cover code configuration and the scheduling information via a same control message.

11. An apparatus for wireless communication comprising:
memory; and
at least one processor of a network entity, the at least one processor coupled with the memory, and the at least one processor configured to cause the apparatus to:

transmit, to a user equipment (UE), an indication of an orthogonal cover code configuration associated with uplink shared channel transmissions for the UE, wherein the orthogonal cover code configuration is associated with a spreading factor that is proportional to a quantity of UEs configured with the orthogonal cover code configuration;

transmit, to the UE, scheduling information for an uplink shared channel transmission; and receive the uplink shared channel transmission from the UE in accordance with the scheduling information and the orthogonal cover code configuration, wherein a quantity of information bits associated with data transmission in the uplink shared channel transmission is based at least in part on the spreading factor that is proportional to the quantity of UEs.

12. The apparatus of claim 11, the at least one processor further configured to cause the apparatus to:

receive, from the UE, an indication of a capability of the UE to apply orthogonal cover coding to uplink shared channel transmissions for the UE, wherein transmission of the indication of the orthogonal cover code configuration is responsive to the indication of the capability of the UE.

13. The apparatus of claim 12, the at least one processor further configured to cause the apparatus to:

transmit, to the UE, an indication of a capability of the network entity to support reception of uplink shared channel transmissions encoded via orthogonal cover coding, wherein reception of the indication of the capability of the UE is responsive to the indication of the capability of the network entity.

14. The apparatus of claim 11, wherein, to receive the uplink shared channel transmission, the at least one processor is further configured to cause the apparatus to:

receive, in accordance with the orthogonal cover code configuration, a transport block having the quantity of information bits based at least in part on the spreading factor.

15. The apparatus of claim 14, wherein:

a quantity of resource elements for the transport block accounts for the spreading factor, the quantity of information bits is based at least in part on the quantity of resource elements, and the quantity of information bits being based at least in part on the spreading factor is due at least in part to the quantity of information bits being based at least in part on the quantity of resource elements.

16. The apparatus of claim 14, wherein:

the quantity of information bits accounts for the spreading factor, the quantity of information bits is further based at least in part on a determination of a quantity of resource elements for the transport block, and the quantity of resource elements is independent of the spreading factor.

17. The apparatus of claim 14, wherein, to receive the transport block, the at least one processor is further configured to cause the apparatus to:

receive the transport block over a set of multiple slots, wherein the scheduling information comprises a time domain resource allocation that indicates the set of multiple slots.

18. The apparatus of claim 11, wherein the orthogonal cover code configuration indicates which rows or columns of a Hadamard matrix or a discrete Fourier transform matrix are associated with the UE.

19. The apparatus of claim 11, the at least one processor further configured to cause the apparatus to:

transmit the indication of the orthogonal cover code configuration via a first control message; and transmit the scheduling information via a second control message.

20. The apparatus of claim 11, the at least one processor further configured to cause the apparatus to:

transmit the indication of the orthogonal cover code configuration and the scheduling information via a same control message.

21. A method for wireless communications at a user equipment (UE), comprising:

receiving an indication of an orthogonal cover code configuration associated with uplink shared channel transmissions for the UE, wherein the orthogonal cover code configuration is associated with a spreading factor that is proportional to a quantity of UEs configured with the orthogonal cover code configuration;

receiving scheduling information for an uplink shared channel transmission; and performing the uplink shared channel transmission in accordance with the scheduling information and the orthogonal cover code configuration, wherein a quantity of information bits associated with data transmission in the uplink shared channel transmission is based at least in part on the spreading factor that is proportional to the quantity of UEs.

22. The method of claim 21, further comprising:

transmitting an indication of a capability of the UE to apply orthogonal cover coding to uplink shared channel transmissions for the UE, wherein reception of the indication of the orthogonal cover code configuration is responsive to the indication of the capability of the UE.

23. The method of claim 22, further comprising:

receiving, from a network entity, an indication of a capability of the network entity to support reception of uplink shared channel transmissions encoded via orthogonal cover coding, wherein transmission of the indication of the capability of the UE is responsive to the indication of the capability of the network entity.

24. The method of claim 21, further comprising:

generating, in accordance with the orthogonal cover code configuration, a transport block having the quantity of information bits based at least in part on the spreading factor, wherein performing the uplink shared channel transmission comprises transmitting the transport block.

25. The method of claim 24, further comprising:

accounting for the spreading factor in a determination of a quantity of resource elements for the transport block, wherein the quantity of information bits is based at least in part on the quantity of resource elements, and wherein the quantity of information bits being based at least in part on the spreading factor is due at least in part to the quantity of information bits being based at least in part on the quantity of resource elements.

26. The method of claim 24, further comprising:

accounting for the spreading factor in a determination of the quantity of information bits, wherein the determination of the quantity of information bits is further based at least in part on a determination of a quantity of resource elements for the transport block, and wherein the quantity of resource elements is independent of the spreading factor.

27. The method of claim 24, wherein transmitting the transport block comprises:

transmitting the transport block over a set of multiple slots, wherein the scheduling information comprises a time domain resource allocation that indicates the set of multiple slots.

28. The method of claim 21, further comprising:

receiving the indication of the orthogonal cover code configuration via a first control message; and receiving the scheduling information via a second control message.

29. The method of claim 21, further comprising:

receiving the indication of the orthogonal cover code configuration and the scheduling information via a same control message.

30. A method for wireless communications at a network entity, comprising:

transmitting, to a user equipment (UE), an indication of an orthogonal cover code configuration associated with uplink shared channel transmissions for the UE, wherein the orthogonal cover code configuration is associated with a spreading factor that is proportional to a quantity of UEs configured with the orthogonal cover code configuration;

transmitting, to the UE, scheduling information for an uplink shared channel transmission; and receiving the uplink shared channel transmission from the UE in accordance with the scheduling information and the orthogonal cover code configuration, wherein a quantity of information bits associated with data transmission in the uplink shared channel transmission is based at least in part on the spreading factor that is proportional to the quantity of UEs.

* * * * *